(12) United States Patent  
Tatsuta et al.

(10) Patent No.: US 8,451,194 B2  
(45) Date of Patent: May 28, 2013

(54) INFORMATION PROCESSING SYSTEM, DIGITAL PHOTO FRAME, INFORMATION PROCESSING METHOD, AND COMPUTER PROGRAM PRODUCT

(75) Inventors: Seiji Tatsuta, Hachioji (JP); Ryohei Sugihara, Machida (JP); Yoichi Iba, Hachioji (JP)

(73) Assignee: Olympus Corporation, Tokyo (JP)

( * ) Notice: Subject to any disclaimer, the term of this patent is extended or adjusted under 35 U.S.C. 154(b) by 923 days.

(21) Appl. No.: 12/561,601

(22) Filed: Sep. 17, 2009

(65) Prior Publication Data

US 2010/0066647 A1    Mar. 18, 2010

(30) Foreign Application Priority Data

Sep. 17, 2008    (JP) .................................. 2008-238030

(51) Int. Cl.
    *G09G 3/00*    (2006.01)
    *G06F 17/00*   (2006.01)
(52) U.S. Cl.
    CPC . *G09G 3/00* (2013.01); *G06F 17/00* (2013.01)
    USPC .............................................. 345/30; 706/54
(58) Field of Classification Search
    None
    See application file for complete search history.

(56) References Cited

U.S. PATENT DOCUMENTS

| 8,103,611 B2 * | 1/2012 | Tuzhilin et al. ................. 706/47 |
| 2004/0143453 A1 * | 7/2004 | Weaver ............................. 705/2 |
| 2007/0288303 A1 * | 12/2007 | Weaver ........................... 705/10 |

FOREIGN PATENT DOCUMENTS

JP        2000-099858        4/2000

* cited by examiner

*Primary Examiner* — Adam R Giesy  
(74) *Attorney, Agent, or Firm* — Scully Scott Murphy & Presser, PC

(57) ABSTRACT

An information processing system includes a media information acquisition section that acquires media information, a media information storage section that stores the media information acquired by the media information acquisition section, a usualness level evaluation section that evaluates a usualness level of a user based on information that includes sensor information from at least one of a behavior sensor that measures a behavior of the user, a condition sensor that measures a condition of the user, and an environment sensor that measures an environment of the user, and a write section that writes the usualness level of the user evaluated by the usualness level evaluation section in the media information storage section so that the usualness level is linked to the media information acquired by the media information acquisition section.

25 Claims, 17 Drawing Sheets

FIG. 4

| TIME (T) | PLACE (P) | OCCASION (O) | CONDITION (f) | USUALNESS LEVEL |
|---|---|---|---|---|
| DAYTIME ON WEEKDAY | OFFICE | MEETING | MODERATE TENSION STATE | HIGH |
| NIGHT ON WEEKDAY | HOTEL NEAR OFFICE | DINNER | RELAX | MEDIUM |
| DAYTIME ON HOLIDAY | SIGHTSEEING SPOT | WALKING | MODERATE EXCITED STATE | LOW |

FIG. 5

| FILE | DATE | TIME | LATITUDE AND LONGITUDE | PLACE | USUALNESS LEVEL |
|---|---|---|---|---|---|
| 071007_0001.jpg | 2007.10.7 (SUN) | 11:22:14 | 36.45.xxxx, 139.36.xxxx | NIKKO TOSHOGU SHRINE | 1 |
| 071007_0002.jpg | 2007.10.7 (SUN) | 11:22:25 | 36.45.xxxx, 139.36.xxxx | NIKKO TOSHOGU SHRINE | 1 |
| 071007_0003.jpg | 2007.10.7 (SUN) | 11:22:40 | 36.45.xxxx, 139.36.xxxx | NIKKO TOSHOGU SHRINE | 1 |
| 071007_0004.jpg | 2007.10.7 (SUN) | 11:37:11 | 36.45.xxxx, 139.36.xxxx | NIKKO TOSHOGU SHRINE | 1 |
| 071007_0005.jpg | 2007.10.7 (SUN) | 11:37:40 | 36.45.xxxx, 139.36.xxxx | NIKKO TOSHOGU SHRINE | 1 |
| ... | ... | ... | ... | ... | |
| 071010_0001.jpg | 2007.10.10 (WED) | 15:10:03 | 35.41.xxxx, 139.41.xxxx | ** BUILDING, SHINJUKU | 10 |
| 071010_0002.jpg | 2007.10.10 (WED) | 15:12:40 | 35.41.xxxx, 139.41.xxxx | ** BUILDING, SHINJUKU | 10 |
| 071010_0003.jpg | 2007.10.10 (WED) | 15:15:12 | 35.41.xxxx, 139.41.xxxx | ** BUILDING, SHINJUKU | 10 |
| 071010_0004.jpg | 2007.10.10 (WED) | 15:17:33 | 35.41.xxxx, 139.41.xxxx | ** BUILDING, SHINJUKU | 10 |
| ... | ... | ... | ... | ... | |
| 071011_0001.jpg | 2007.10.11 (THU) | 20:40:12 | 35.40.xxxx, 139.41.xxxx | ** HOTEL, SHINJUKU | 5 |
| 071011_0002.jpg | 2007.10.11 (THU) | 20:40:30 | 35.40.xxxx, 139.41.xxxx | ** HOTEL, SHINJUKU | 5 |
| 071011_0003.jpg | 2007.10.11 (THU) | 20:41:03 | 35.40.xxxx, 139.41.xxxx | ** HOTEL, SHINJUKU | 5 |
| 071011_0004.jpg | 2007.10.11 (THU) | 20:55:14 | 35.40.xxxx, 139.41.xxxx | ** HOTEL, SHINJUKU | 5 |
| 071011_0005.jpg | 2007.10.11 (THU) | 20:55:55 | 35.40.xxxx, 139.41.xxxx | ** HOTEL, SHINJUKU | 5 |
| ... | | | | ... | |
| ... | | | | ... | |
| ... | | | | ... | |

FIG. 8A DURING SEARCH

| PLACE OF STAY | USUALNESS LEVEL N | EXTRACTION RATE |
|---|---|---|
| LONDON | 1 | 100% |
| OSAKA | 4 | 70% |
| SHINJUKU | 10 | 5% |

FIG. 8B DURING TRANSFER (ARCHIVE)

| PLACE OF STAY | USUALNESS LEVEL N | EXTRACTION RATE |
|---|---|---|
| LONDON | 1 | 0% |
| OSAKA | 4 | 20% |
| SHINJUKU | 10 | 60% |

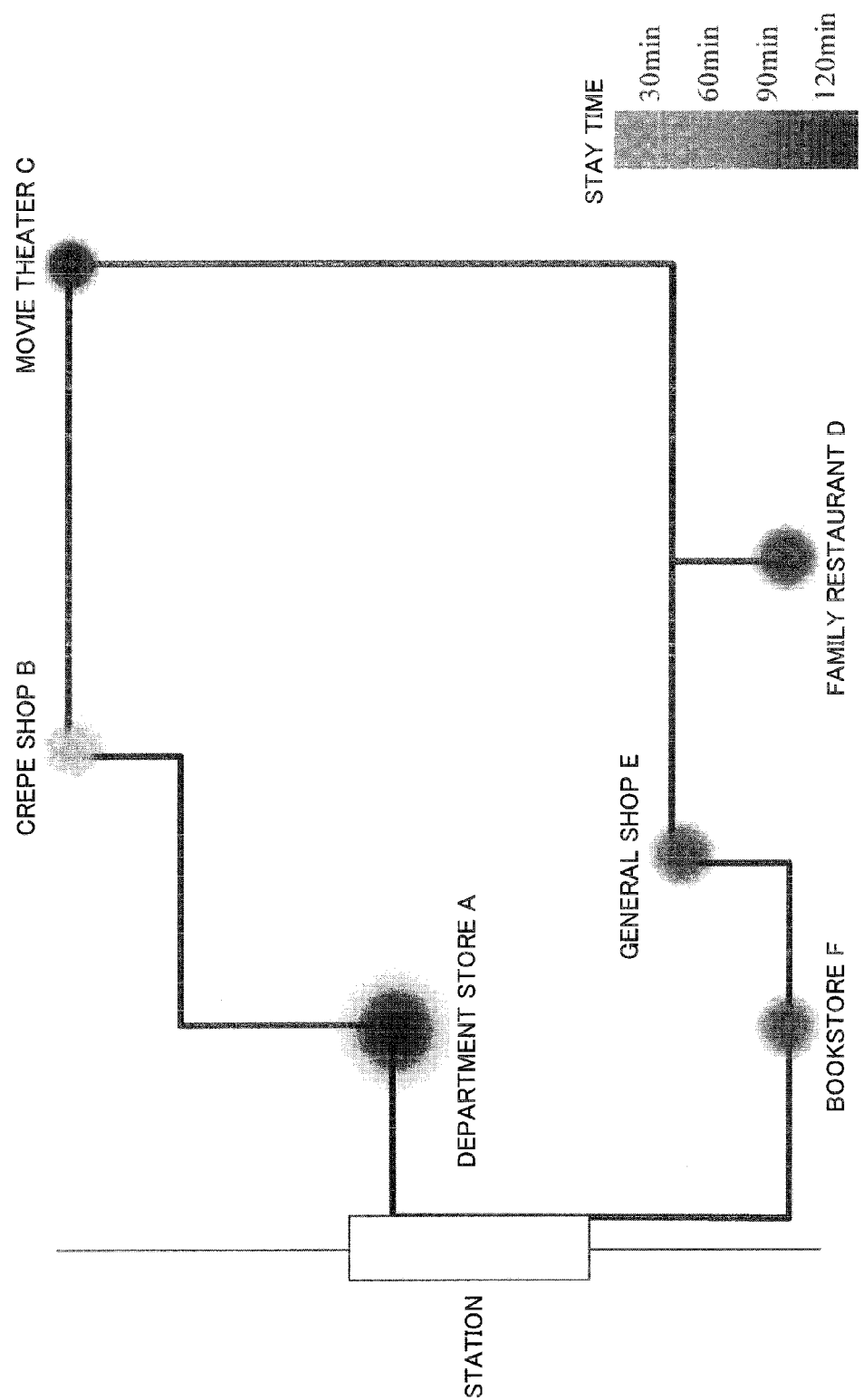

FIG. 12A AREA
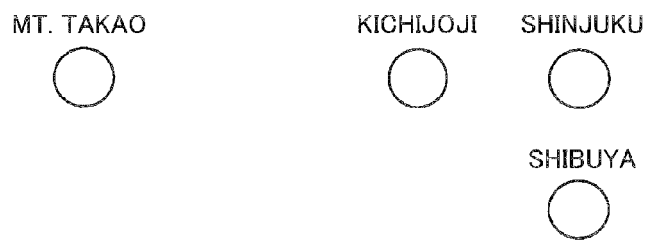
FIG. 12B SPOT
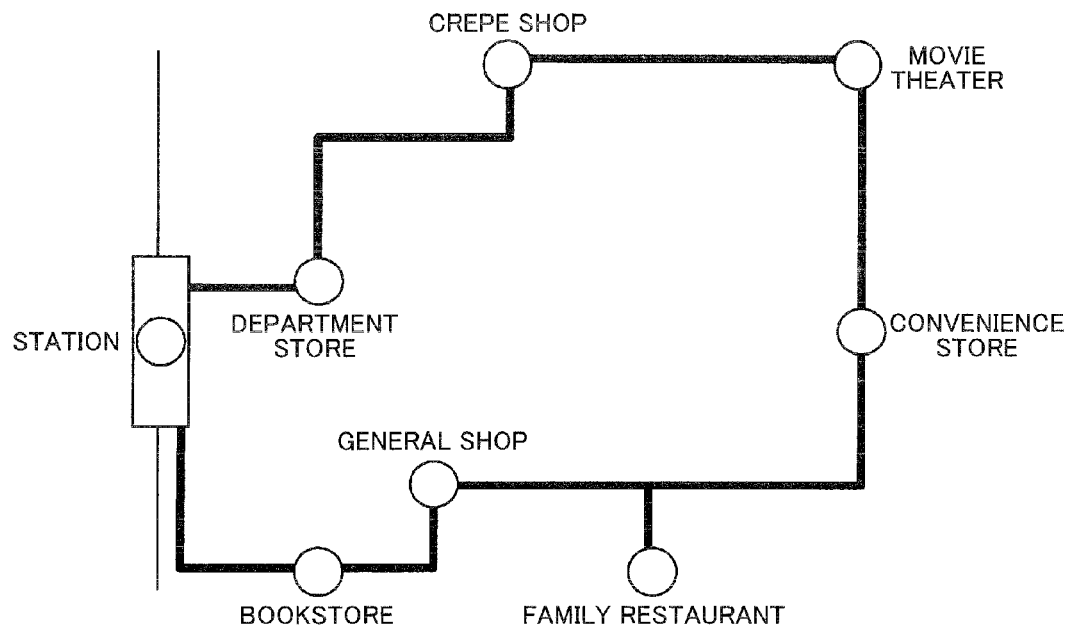

FIG. 14

| AREA | SPOT | CUMULATIVE STAY TIME WITHIN ONE MONTH[H] | | | | CUMULATIVE STAY TIME WITHIN ONE MONTH[%] | | | |
|---|---|---|---|---|---|---|---|---|---|
| | | DAYTIME ON WEEKDAY | MORNING AND NIGHT ON WEEKDAY | DAYTIME ON HOLIDAY | MORNING AND NIGHT ON HOLIDAY | DAYTIME ON WEEKDAY | MORNING AND NIGHT ON WEEKDAY | DAYTIME ON HOLIDAY | MORNING AND NIGHT ON HOLIDAY |
| MINAMINO | HOME | 0.0 | 190.0 | 40.0 | 80.0 | 0% | 72% | 42% | 83% |
| MINAMINO | SUPERMARKET ** | 0.0 | 0.0 | 10.0 | 0.0 | 0% | 0% | 10% | 0% |
| MINAMINO | ** BOOKSTORE | 0.0 | 0.0 | 4.0 | 0.0 | 0% | 0% | 4% | 0% |
| ....... | ....... | | | | | | | | |
| SHINJUKU | OFFICE | 221.5 | 22.0 | 0.0 | 0.0 | 84% | 8% | 0% | 0% |
| SHINJUKU | SMALL RESTAURANT ** | 0.0 | 7.5 | 0.0 | 0.0 | 0% | 3% | 0% | 0% |
| SHINJUKU | TAVERN ** | 0.0 | 13.0 | 0.0 | 0.0 | 0% | 5% | 0% | 0% |
| SHINJUKU | ** DEPARTMENT STORE | 0.0 | 0.0 | 3.0 | 0.0 | 0% | 0% | 3% | 0% |
| SHINJUKU | ** MUSEUM | 0.0 | 0.0 | 4.5 | 0.0 | 0% | 0% | 5% | 0% |
| ....... | ....... | | | | | | | | |
| TACHIKAWA | ** MOVIE THEATER | 0.0 | 0.0 | 2.5 | 0.0 | 0% | 0% | 3% | 0% |
| TACHIKAWA | ** DEPARTMENT STORE | 0.0 | 0.0 | 4.0 | 0.0 | 0% | 0% | 4% | 0% |
| ....... | ....... | | | | | | | | |
| MT. TAKAO | --- | 0.0 | 0.0 | 6.0 | 0.0 | 0% | 0% | 6% | 0% |
| TOKORO-ZAWA | PARENTS' HOME | 0.0 | 0.0 | 12.5 | 10.0 | 0% | 0% | 13% | 10% |
| ....... | ....... | | | | | | | | |
| MACHIDA | ** WEAR | 0.0 | 0.0 | 1.0 | 0.0 | 0% | 0% | 1% | 0% |
| MACHIDA | ** DOUGHNUT | 0.0 | 0.0 | 0.5 | 0.0 | 0% | 0% | 1% | 0% |
| ....... | ....... | | | | | | | | |

FIG. 15A

| PROBABILITY | USUALNESS LEVEL N (VALUE USED TO CALCULATE USUALNESS LEVEL) |
|---|---|
| LESS THAN 0.5% | 1 |
| LESS THAN 1% | 2 |
| LESS THAN 2% | 3 |
| LESS THAN 3% | 4 |
| LESS THAN 5% | 5 |
| LESS THAN 7% | 6 |
| LESS THAN 10% | 7 |
| LESS THAN 13% | 8 |
| LESS THAN 17% | 9 |
| 17% OR MORE | 10 |

FIG. 15B

| NUMBER OF TIMES WITHIN GIVEN PERIOD | USUALNESS LEVEL N |
|---|---|
| LESS THAN 1 | 1 |
| LESS THAN 2 | 2 |
| LESS THAN 4 | 3 |
| LESS THAN 7 | 4 |
| LESS THAN 11 | 5 |
| LESS THAN 16 | 6 |
| LESS THAN 22 | 7 |
| LESS THAN 30 | 8 |
| LESS THAN 42 | 9 |
| 60 OR MORE | 10 |

INFORMATION PROCESSING SYSTEM, DIGITAL PHOTO FRAME, INFORMATION PROCESSING METHOD, AND COMPUTER PROGRAM PRODUCT

Japanese Patent Application No. 2008-238030 filed on Sep. 17, 2008, is hereby incorporated by reference in its entirety.

BACKGROUND

The present invention relates to an information processing system, a digital photo frame, an information processing method, a computer program product, and the like.

An image photographed using a digital camera (electronic camera) (e.g., digital still camera or digital video camera) can be stored as digital image data. Therefore, a digital camera allows the user to easily take photographs without taking account of the cost of a film and the like, differing from a silver salt camera, and store the photographed image in a hard disk drive (HDD) of a personal computer (PC), for example.

The user of a digital camera tends to take a large number of landscape/scenery photographs since a digital camera makes it easy to take photographs. Therefore, a large number of images that are not reproduced are generally stored in an HDD of a PC, for example. As a result, the storage capacity of the HDD may be unnecessarily used, or it may be difficult to search the desired image from the stored images. In recent years, a large amount of image data may be recorded as a life log along with an increase in capacity and a decrease in cost of memories. This tendency is expected to rise in the future.

It is desirable to appropriately tag images in advance so that the desired images can be easily searched and arranged. However, it is troublesome to tag images during photographing. Moreover, the user may not be able to appropriately tag images. On the other hand, an unusual experience is a precious experience for the user to look back on his state. It is possible to prompt the user to change his usual life pattern by allowing the user to recall an unusual experience through media information.

JP-A-2000-99858 discloses a system that monitors abnormal behavior of a solitary old person. This system aims at automatically detecting and indicating a situation in which a solitary old person has become incapacitated, but does not relate to technology that links media information to unusual behavior.

SUMMARY

According to one aspect of the invention, there is provided an information processing system comprising:

a media information acquisition section that acquires media information;

a media information storage section that stores the media information acquired by the media information acquisition section;

a usualness level evaluation section that evaluates a usualness level of a user based on information that includes sensor information from at least one of a behavior sensor that measures a behavior of the user, a condition sensor that measures a condition of the user, and an environment sensor that measures an environment of the user; and a write section that writes the usualness level of the user evaluated by the usualness level evaluation section in the media information storage section so that the usualness level is linked to the media information acquired by the media information acquisition section.

According to another aspect of the invention, there is provided a digital photo frame comprising:

a display; and a display control section that displays an image on the display based on image data, the image data being the media information that has been written into the media information storage section by the above information processing system.

According to another aspect of the invention, there is provided an information processing system comprising:

a media information storage section that stores media information and a usualness level of a user when the media information was acquired, the media information being linked to the usualness level of the user; and a search section that searches the media information stored in the media information storage section using the usualness level of the user linked to the media information, the search section preferentially extracting the media information that was acquired when the usualness level of the user was low from the media information stored in the media information storage section.

According to another aspect of the invention, there is provided a digital photo frame comprising:

a display; and a display control section that displays an image on the display based on image data, the image data being the media information that has been extracted by the above information processing system.

According to another aspect of the invention, there is provided an information processing system comprising:

a media information storage section that stores media information and a usualness level of a user when the media information was acquired, the media information being linked to the usualness level of the user; and a transfer section that extracts the media information stored in the media information storage section using the usualness level of the user linked to the media information, and transfers the extracted media information to a second media information storage section, the transfer section preferentially extracting the media information that was acquired when the usualness level of the user was high from the media information stored in the media information storage section, and transferring the extracted media information to the second media information storage section while deleting the extracted media information from the media information storage section.

According to another aspect of the invention, there is provided an information processing method comprising:

acquiring media information;

storing the acquired media information in a media information storage section;

evaluating a usualness level of a user based on information that includes sensor information from at least one of a behavior sensor that measures a behavior of the user, a condition sensor that measures a condition of the user, and an environment sensor that measures an environment of the user; and writing the usualness level of the user obtained by the evaluation in the media information storage section so that the usualness level is linked to the acquired media information.

According to another aspect of the invention, there is provided an information processing method comprising:

storing media information and a usualness level of a user when the media information was acquired in a media information storage section, the media information being linked to the usualness level of the user;

searching the media information stored in the media information storage section using the usualness level of the user linked to the media information; and preferentially extracting the media information that was acquired when the usualness level of the user was low from the media information stored in the media information storage section.

According to another aspect of the invention, there is provided an information processing method comprising:

storing media information and a usualness level of a user when the media information was acquired in a media information storage section, the media information being linked to the usualness level of the user;

extracting the media information stored in the media information storage section using the usualness level of the user linked to the media information;

transferring the extracted media information to a second media information storage section;

preferentially extracting the media information that was acquired when the usualness level of the user was high from the media information stored in the media information storage section; and transferring the extracted media information to the second media information storage section while deleting the extracted media information from the media information storage section.

According to another aspect of the invention, there is provided a computer program product storing a program code that causes a computer to execute the above information processing method.

BRIEF DESCRIPTION OF THE DRAWINGS

FIG. 4 is a view illustrative of a usualness level evaluation process.

FIG. 5 shows an example of the data structure of a media information storage section.

FIGS. 8A and 8B are views illustrative of a media information extraction rate.

FIG. 11 is a view illustrative of the position distribution in the place of stay of the user.

FIGS. 12A and 12B are views illustrative of a stay area and a stay spot.

FIG. 14 is a view illustrative of the probability that the user stays in each place.

FIGS. 15A and 15B are views illustrative of a usualness level calculation method based on probability or the number of times that the user stays in each place.

DESCRIPTION OF EXEMPLARY EMBODIMENTS

Figure 1A:
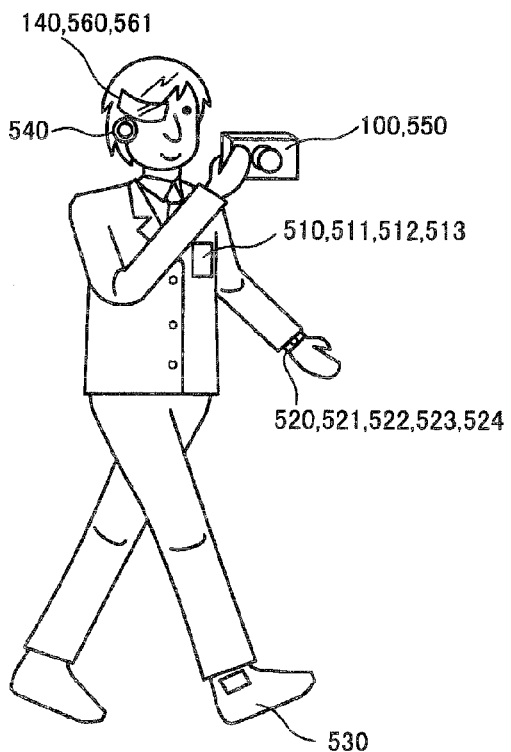
FIGS. 1A and 1B are views illustrative of a sensor information acquisition method.

Several aspects of the invention may provide an information processing system, a digital photo frame, an information processing method, a computer program product, and the like that enable the usualness level of the user to be linked to media information.

According to one embodiment of the invention, there is provided an information processing system comprising:

a media information acquisition section that acquires media information;

a media information storage section that stores the media information acquired by the media information acquisition section;

a usualness level evaluation section that evaluates a usualness level of a user based on information that includes sensor information from at least one of a behavior sensor that measures a behavior of the user, a condition sensor that measures a condition of the user, and an environment sensor that measures an environment of the user; and a write section that writes the usualness level of the user evaluated by the usualness level evaluation section in the media information storage section so that the usualness level is linked to the media information acquired by the media information acquisition section.

According to this embodiment, the sensor information from at least one of the behavior sensor, the condition sensor, and the environment sensor is acquired, and the usualness level of the user is evaluated based on the acquired sensor information and the like. The usualness level of the user is written into the media information storage section so that the usualness level is linked to the acquired media information. This makes it possible to link the usualness level of the user (e.g., when the media information was acquired) to the media information so that various processes can be performed on the media information using the usualness level.

The information processing system may further comprise:

a search section that searches the media information stored in the media information storage section using the usualness level of the user linked to the media information.

This makes it possible to search the media information based on the usualness level.

In the information processing system, the search section may preferentially extract the media information that was acquired when the usualness level of the user was low from the media information stored in the media information storage section.

According to this configuration, the media information acquired in a state for which the usualness level is low can be preferentially extracted and presented to the user, for example.

The information processing system may further comprise:

a transfer section that extracts the media information stored in the media information storage section using the usualness level of the user linked to the media information, and transfers the extracted media information to a second media information storage section.

This makes it possible to transfer the media information based on the usualness level.

In the information processing system, the transfer section may preferentially extract the media information that was acquired when the usualness level of the user was high from the media information stored in the media information storage section, and may transfer the extracted media information to the second media information storage section while deleting the extracted media information from the media information storage section.

According to this configuration, the media information acquired in a state for which the usualness level of the user is high can be preferentially extracted and transferred to the second media information storage section. This makes it possible to efficient arrange the media information, for example.

In the information processing system,
the second media information storage section may be an archive storage section that has a capacity larger than that of the media information storage section.

According to this configuration, the media information can be transferred to and stored in the second media information storage section as archive information when the storage capacity of the media information storage section remains to only a small extent, for example.

The information processing system may further comprise:
a state estimation section that estimates a state of the user based on information that includes sensor information from at least one of the behavior sensor that measures a behavior of the user, the condition sensor that measures a condition of the user, and the environment sensor that measures an environment of the user,
the usualness level evaluation section may evaluate the usualness level of the user based on the state of the user estimated by the state estimation section.

According to this configuration, the usualness level of the user can be evaluated based on the state of the user estimated based on the information including the sensor information.

The information processing system may further comprise:
a usualness level information storage section that stores the usualness level so that the usualness level is linked to a place of stay of the user,
the state estimation section may specify the place of stay of the user when the user acquired the media information; and
the usualness level evaluation section may evaluate the usualness level of the user by reading the usualness level linked to the specified place of stay of the user from the usualness level information storage section.

According to this configuration, the usualness level can be evaluated based on the place of stay of the user, and can be linked to the media information acquired in the place of stay of the user.

In the information processing system,
the usualness level information storage section may store the usualness level so that the usualness level is linked to the place of stay of the user and a time zone of stay of the user,
the state estimation section may specify the place and time zone of stay of the user when the user acquired the media information, and
the usualness level evaluation section may evaluate the usualness level of the user by reading the usualness level linked to the specified place and time zone of stay of the user from the usualness level information storage section.

According to this configuration, the usualness level can be evaluated based on the place and the time zone of stay of the user, and can be linked to the media information acquired in the place and the time zone of stay of the user.

The information processing system may further comprise:
a search section that searches the media information stored in the media information storage section using the usualness level of the user linked to the media information,
the search section may extract the media information at an extraction rate that increases as the usualness level of the user with respect to the place of stay of the user when the user acquired the media information decreases.

According to this configuration, the media information acquired in a place linked to a low usualness level can be extracted at a high extraction rate.

The information processing system may further comprise:
a transfer section that extracts the media information stored in the media information storage section using the usualness level of the user linked to the media information, and transfers the extracted media information to a second media information storage section,
the transfer section may extract the media information at an extraction rate that increases as the usualness level of the user with respect to the place of stay of the user when the user acquired the media information increases, and may transfer the extracted media information to the second media information storage section while deleting the extracted media information from the media information storage section.

According to this configuration, the media information acquired in a place linked to a high usualness level can be extracted at a high extraction rate, and transferred to the second media information storage section.

In the information processing system,
the state estimation section may specify a stay area and a stay spot as the place of stay of the user, the stay spot being smaller than the stay area, and
when the state estimation section has specified the stay spot as the place of stay of the user, the usualness level evaluation section may evaluate the usualness level of the user by reading the usualness level linked to the specified stay spot from the usualness level information storage section.

The usualness level can be evaluated more accurately and appropriately by utilizing the usualness level linked to the stay spot that is smaller than the stay area and has a different meaning for the user.

In the information processing system,
the state estimation section may determine whether or not the user stays within the stay area based on whether or not a standard deviation of a position of the user within a given period is equal to or less than a given first threshold value, and may determine whether the user stays within the stay spot based on whether or not the standard deviation of the position of the user within the given period is equal to or less than a given second threshold value, the given second threshold value being smaller than the first threshold value.

According to this configuration, the place where the user stays can be specified as the area or spot (meaningful area) by a statistical process that determines the standard deviation of the position of the user within a given period.

According to another embodiment of the invention, there is provided a digital photo frame comprising:
a display; and
a display control section that displays an image on the display based on image data, the image data being the media information that has been written into the media information storage section by the one of the above information processing systems.

A novel digital photo frame reproduction process can be implemented by thus controlling the image displayed on the display based on the usualness level linked to the image data.

According to another embodiment of the invention, there is provided an information processing system comprising:

a media information storage section that stores media information and a usualness level of a user when the media information was acquired, the media information being linked to the usualness level of the user; and a search section that searches the media information stored in the media information storage section using the usualness level of the user linked to the media information, the search section preferentially extracting the media information that was acquired when the usualness level of the user was low from the media information stored in the media information storage section.

According to this embodiment, the media information storage section stores the media information and the usualness level of the user when the media information was acquired, the media information being linked to the usualness level of the user. The media information is searched using the usualness level of the user linked to the media information, and the media information acquired when the usualness level of the user was low is preferentially extracted. According to this configuration, the media information for which the usualness level is low can be preferentially extracted and presented to the user, for example.

In the information processing system, the search section may extract the media information at an extraction rate that increases as the usualness level of the user with respect to a place of stay of the user when the user acquired the media information decreases.

According to another embodiment of the invention, there is provided a digital photo frame comprising:

a display; and a display control section that displays an image on the display based on image data, the image data being the media information that has been extracted by the above information processing system.

This makes it possible to provide a digital photo frame that preferentially reproduces the image for which the usualness level is low.

According to another embodiment of the invention, there is provided an information processing system comprising:

a media information storage section that stores media information and a usualness level of a user when the media information was acquired, the media information being linked to the usualness level of the user; and a transfer section that extracts the media information stored in the media information storage section using the usualness level of the user linked to the media information, and transfers the extracted media information to a second media information storage section, the transfer section preferentially extracting the media information that was acquired when the usualness level of the user was high from the media information stored in the media information storage section, and transferring the extracted media information to the second media information storage section while deleting the extracted media information from the media information storage section.

According to this embodiment, the media information storage section stores the media information and the usualness level of the user when the media information was acquired, the media information being linked to the usualness level of the user. The media information is transferred to the second media information storage section using the usualness level of the user linked to the media information, and the media information acquired when the usualness level of the user was high is preferentially extracted and transferred. Therefore, the media information linked to a high usualness level can be deleted from the media information storage section, and transferred to and stored in the second media information storage section.

In the information processing system, the transfer section may extracting the media information at an extraction rate that increases as the usualness level of the user with respect to a place of stay of the user when the user acquired the media information increases, and may transfer the extracted media information to the second media information storage section while deleting the extracted media information from the media information storage section.

According to another embodiment of the invention, there is provided an information processing method comprising:

acquiring media information;

storing the acquired media information in a media information storage section;

evaluating a usualness level of a user based on information that includes sensor information from at least one of a behavior sensor that measures a behavior of the user, a condition sensor that measures a condition of the user, and an environment sensor that measures an environment of the user; and writing the usualness level of the user obtained by the evaluation in the media information storage section so that the usualness level is linked to the acquired media information.

According to another embodiment of the invention, there is provided an information processing method comprising:

storing media information and a usualness level of a user when the media information was acquired in a media information storage section, the media information being linked to the usualness level of the user;

searching the media information stored in the media information storage section using the usualness level of the user linked to the media information; and preferentially extracting the media information that was acquired when the usualness level of the user was low from the media information stored in the media information storage section.

According to another embodiment of the invention, there is provided an information processing method comprising:

storing media information and a usualness level of a user when the media information was acquired in a media information storage section, the media information being linked to the usualness level of the user;

extracting the media information stored in the media information storage section using the usualness level of the user linked to the media information;

transferring the extracted media information to a second media information storage section;

preferentially extracting the media information that was acquired when the usualness level of the user was high from the media information stored in the media information storage section; and transferring the extracted media information to the second media information storage section while deleting the extracted media information from the media information storage section.

According to another embodiment of the invention, there is provided a computer program product storing a program code that causes a computer to execute the above information processing method.

The term "computer program product" refers to an information storage medium, a device, an instrument, a system, or the like that stores a program code, such as an information storage medium (e.g., optical disk medium (e.g., DVD), hard disk medium, and memory medium) that stores a program code, a computer that stores a program code, or an Internet system (e.g., a system including a server and a client terminal), for example. In this case, each element and each process according to the above embodiments are implemented by corresponding modules, and a program code that includes these modules is recorded in the computer program product.

Embodiments of the invention are described below. Note that the following embodiments do not in any way limit the scope of the invention laid out in the claims. Note that all elements of the following embodiments should not necessarily be taken as essential requirements for the invention.

1. Acquisition of Sensor Information

In this embodiment, sensor information from a behavior sensor (behavior measurement section), a condition sensor (condition measurement section), and an environment sensor (environment measurement section) that respectively measure the behavior, the condition, and the environment of the user are acquired in order to link the usualness level of the user to media information such as an image (video or still image) and sound (voice or music). The current usualness level (unusualness level) of the user is evaluated based on the acquired sensor information (i.e., the state of the user estimated based on the sensor information) and the like. A method of acquiring the sensor information is described below.

In FIG. 1A, the user carries a portable electronic instrument 100 (i.e., digital camera (digital still camera or digital video camera)). The user wears a wearable display 140 (mobile display) near one of the eyes as a mobile control target instrument. The user also wears various sensors as wearable sensors (mobile sensors). Specifically, the user wears an indoor/outdoor sensor 510, an ambient temperature sensor 511, an ambient humidity sensor 512, an ambient luminance sensor 513, a wrist-mounted movement measurement sensor 520, a pulse (heart rate) sensor 521, a body temperature sensor 522, a peripheral skin temperature sensor 523, a sweat sensor 524, a foot pressure sensor 530, a speech/mastication sensor 540, a Global Position System (GPS) sensor 550 provided in the portable electronic instrument 100, a complexion sensor 560 and a pupil sensor 561 provided in the wearable display 140, and the like. A mobile subsystem is formed by the portable electronic instrument 100, mobile control target instruments such as the wearable display 140, the wearable sensors, and the like.

The portable electronic instrument 100 (mobile computer) (e.g., digital camera) may include a processor (CPU), a memory, an operation panel, a communication device, a display, and the like. The portable electronic instrument 100 also includes an imaging section and a microphone so that the portable electronic instrument 100 can acquire media information such as an image and sound. The portable electronic instrument 100 also includes a position detection sensor such as the GPS sensor 550 so that the portable electronic instrument 100 can acquire position information about the user, and can acquire time information (e.g., date and time) by utilizing a clock function.

Figure 1B:
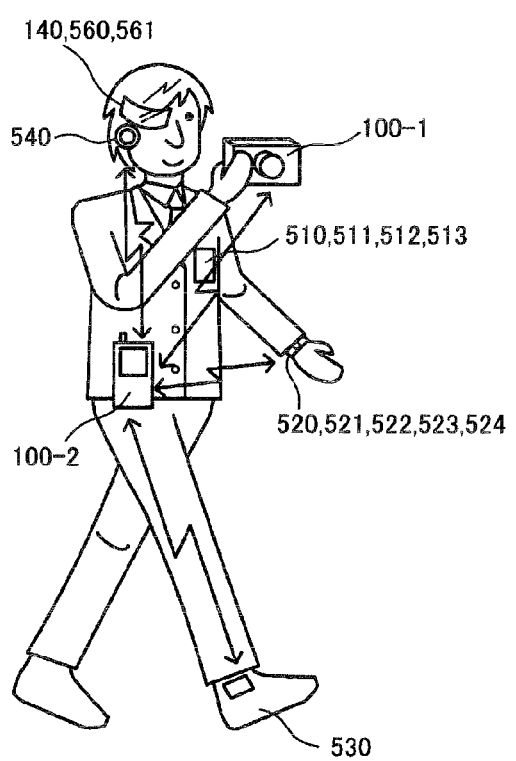

Note that the portable electronic instrument 100 is not limited to a digital camera, but may be a personal digital assistant, a portable game machine, a portable telephone, a wristwatch, a portable audio instrument, or the like that has a function of acquiring media information (e.g., imaging section and microphone). As shown in FIG. 1B, the user may carry two portable electronic instruments 100-1 and 100-2. In FIG. 1B, the portable electronic instrument 100-1 (e.g., digital camera) acquires media information (e.g., image), and transfers the acquired media information to the portable electronic instrument 100-2 by utilizing wireless communication. The portable electronic instrument 100-2 has a function of collecting sensor information from a sensor, a function of performing a calculation process based on the collected sensor information, a function of controlling (e.g., display control) the control target instrument (e.g., wearable display) or acquiring information from an external database based on the calculation results, a function of communicating with the outside, and the like. State historical information about the user and the acquired media information are stored in a storage section of the portable electronic instrument 100-2.

The user wears the wearable display 140 (information presentation section in a broad sense) near one of the eyes of the user. The wearable display 140 is set so that the display section is smaller than the pupil, and functions as a see-through viewer information display section. Information may be presented (provided) to the user using a headphone, a vibrator, or the like. Examples of the mobile control target instrument (information presentation section) other than the wearable display 140 include a wristwatch, a portable telephone, a portable audio player, and the like.

The indoor/outdoor sensor detects whether the user stays in a room or stays outdoors. For example, the indoor/outdoor sensor emits ultrasonic waves, and measures the time required for the ultrasonic waves to be reflected by a ceiling or the like and return to the indoor/outdoor sensor. The indoor/outdoor sensor 510 is not limited to an ultrasonic sensor, but may be an active optical sensor, a passive ultraviolet sensor, a passive infrared sensor, or passive noise sensor.

The ambient temperature sensor 511 measures the ambient temperature using a thermistor, a radiation thermometer, a thermocouple, or the like. The ambient humidity sensor 512 measures the ambient humidity by utilizing a phenomenon in which an electrical resistance changes due to humidity, for example. The ambient luminance sensor 513 measures the ambient luminance using a photoelectric element, for example.

The wrist-mounted movement measurement sensor 520 measures the movement of the arm of the user using an acceleration sensor or an angular acceleration sensor. The daily performance and the walking state of the user can be more accurately measured using the movement measurement sensor 520 and the foot pressure sensor 530. The pulse (heart rate) sensor 521 is attached to the wrist, finger, or ear of the user, and measures a change in bloodstream due to pulsation based on a change in transmittance or reflectance of infrared light. The body temperature sensor 522 and the peripheral skin temperature sensor 523 measure the body temperature and the peripheral skin temperature of the user using a thermistor, a radiation thermometer, a thermocouple, or the like. The sweat sensor 524 measures skin perspiration based on a change in the surface resistance of the skin, for example. The foot pressure sensor 530 detects the distribution of pressure applied to the shoe, and determines that the user is in a standing state, a sitting state, a walking state, or the like.

The speech/mastication sensor 540 is an earphone-type sensor that measures the possibility that the user speaks (conversation) or masticates (eating). The speech/mastication sensor 540 includes a bone conduction microphone and an ambient sound microphone provided in a housing. The bone conduction microphone detects body sound that is a vibration that occurs from the body during speech/mastication and is propagated inside the body. The ambient sound microphone detects voice that is a vibration that is transmitted to the outside of the body due to speech, or ambient sound including environmental noise. The speech/mastication sensor 540 measures the possibility that the user speaks or masticates by comparing the power of the sound captured by the bone conduction microphone with the power of the sound captured by the ambient sound microphone per unit time, for example.

The GPS sensor 550 detects the position (location) of the user. Note that a portable telephone position information service or peripheral wireless LAN position information may be utilized instead of the GPS sensor 550. The complexion sensor 560 includes an optical sensor disposed near the face, and compares the luminance of light through a plurality of optical band-pass filters to measure the complexion, for example. The pupil sensor 561 includes a camera disposed near the pupil, and analyzes a camera signal to measure the size of the pupil, for example.

2. First System Configuration Example

Figure 2:
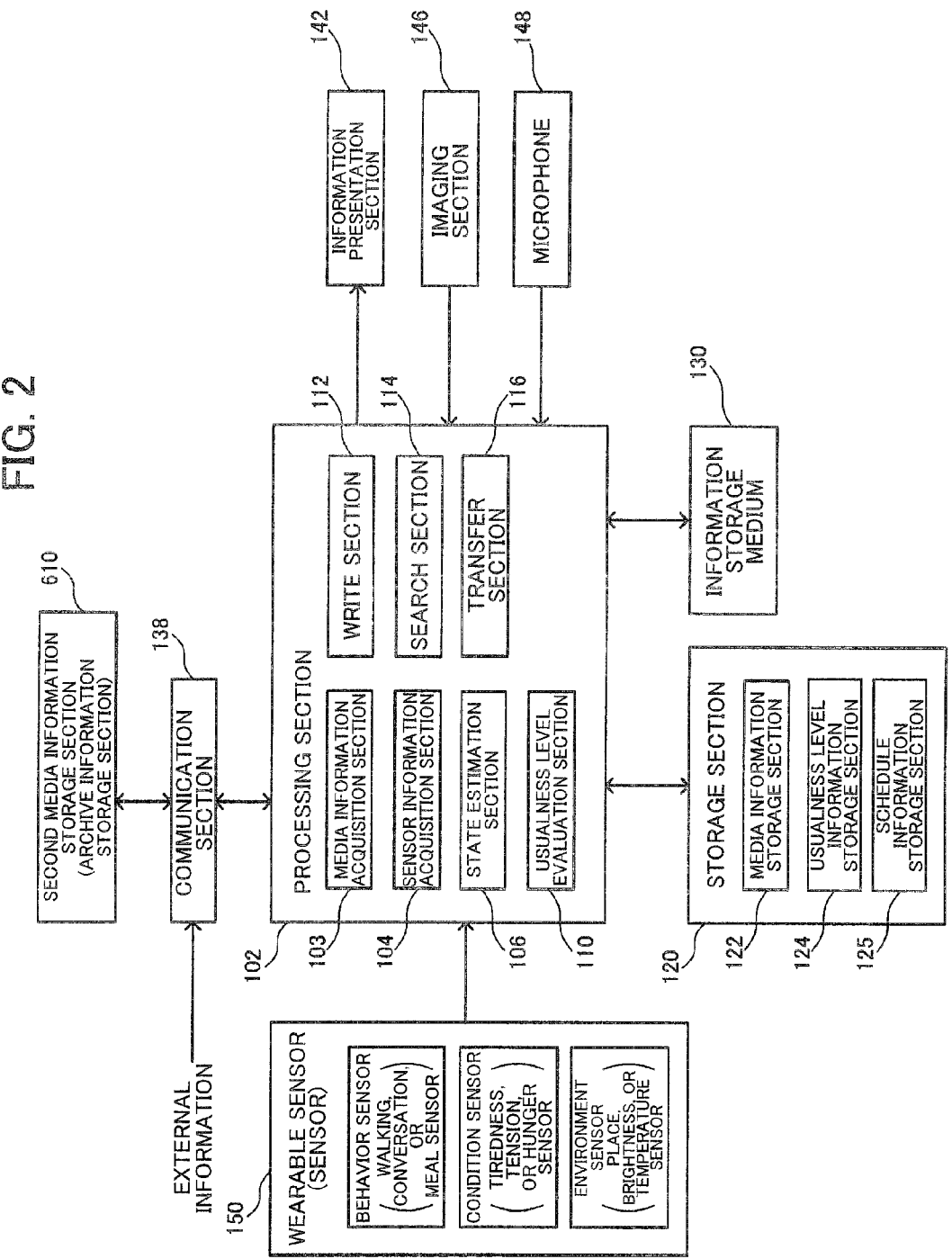
FIG. 2 shows a first system configuration example according to one embodiment of the invention.

FIG. 2 shows a first system configuration example of an information processing system (information presentation system) according to this embodiment. FIG. 2 shows an example in which the information processing system according to this embodiment is implemented by the portable electronic instrument 100.

A processing section 102 performs various processes based on operation information input from an operation section (not shown), sensor information acquired from a wearable sensor 150, and the like. For example, the processing section 102 acquires media information and sensor information, performs calculations and evaluations, and controls information presentation using an information presentation section 142 (e.g., display). The function of the processing section 102 may be implemented by hardware such as a processor (e.g., CPU) or an ASIC (e.g., gate array), a program stored in an information storage medium 130 (e.g., optical disk, IC card, or HDD), or the like.

A storage section 120 serves as a work area for the processing section 102, the communication section 138, and the like. The function of the storage section 120 may be implemented by a memory (e.g., RAM), a hard disk drive (HDD), or the like. The storage section 120 includes a media information storage section 122, a usualness level information storage section 124, and a schedule information storage section 125.

The information storage medium 130 (computer-readable medium) stores a program, data, and the like. The function of the information storage medium 130 may be implemented by an optical disk (CD or DVD) or the like. The processing section 102 performs various processes according to this embodiment based on a program (data) stored in the information storage medium 130. Specifically, the information storage medium 130 stores a program that causes a computer (i.e., a device including an operation section, a processing section, a storage section, and an output section) to function as each section according to this embodiment (i.e., a program that causes a computer to execute the process of each section).

The processing section 102 includes a media information acquisition section 103, a sensor information acquisition section 104, a state estimation section 106, a usualness level evaluation section 110, a write section 112, a search section 114, and a transfer section 116. Note that various modifications may be made, such as omitting some (e.g., state estimation section, search section, and transfer section) of these elements or adding other elements.

The media information acquisition section 103 acquires media information such as an image (still image or video), voice, music, and text information. For example, when an imaging section 146 (e.g., CCD or CMOS sensor) has captured an object or voice has been recorded through a microphone 148, the media information acquisition section 103 acquires the captured image or the recorded voice. The acquired media information (e.g., image or voice) is stored in the media information storage section 122. In FIG. 1B, when the portable electronic instrument 100-1 (digital camera) has captured an image, the portable electronic instrument 100-2 acquires the image from the portable electronic instrument 100-1 by utilizing wireless communication or the like.

The sensor information acquisition section 104 acquires sensor information from the wearable sensor 150 (sensor in a broad sense). Specifically, the wearable sensor 150 includes at least one of a behavior sensor that measures the behavior (e.g., walk, conversation, meal, movement of hands and feet, emotion, or sleep) of the user, a condition sensor that measures the condition (e.g., tiredness, tension, hunger, mental state, physical condition, or event that has occurred for the user) of the user, and an environment sensor that measures the environment (place, time, brightness, temperature, or humidity) of the user. The sensor information acquisition section 104 acquires sensor information from these sensors.

Note that the sensor may be a sensor device, or may be a sensor instrument that includes a control section, a communication section, and the like in addition to the sensor device. The sensor information may be primary sensor information directly obtained from the sensor, or may be secondary sensor information obtained by processing (information processing) the primary sensor information.

The state estimation section 106 (state identification section) estimates (identifies) the state of the user (at least one of the behavior, the condition, and the environment of the user) based on the sensor information acquired by the sensor information acquisition section 104 and the like. Specifically, the state estimation section 106 multiplies or sums up the acquired sensor information to implement various calculation processes for filtering (selecting) or analyzing the sensor information, for example. The state estimation section 106 then performs a state identification process that estimates the current state of the user. Alternatively, the state estimation section 106 then performs a state prediction process that estimates the future state of the user.

As shown by the following expression (1), digitized measured values $X_j$ of a plurality of pieces of sensor information from a plurality of sensors and each coefficient are stored in a coefficient storage section (not shown), and the state estimation section 106 performs product-sum calculations on the measured values $X_j$ and coefficients $A_{ij}$ shown by a two-dimensional matrix, for example. As shown by the following expression (2), the state estimation section 106 calculates the n-dimensional vector $Y_i$ using the product-sum calculation results as multi-dimensional coordinates. Note that i is the i coordinate in the n-dimensional space, and j is a number assigned to each sensor.

$$\begin{pmatrix} Y_0 \\ Y_1 \\ Y_2 \\ \vdots \\ Y_i \\ \vdots \\ Y_n \end{pmatrix} = \begin{pmatrix} A_{00} & \cdots & A_{0m} \\ \vdots & & \vdots \\ \vdots & A_{ij} & \vdots \\ \vdots & & \vdots \\ A_{n0} & \cdots & A_{nm} \end{pmatrix} \begin{pmatrix} X_0 \\ X_1 \\ X_2 \\ \vdots \\ X_j \\ \vdots \\ X_m \end{pmatrix} \quad (1)$$

$$Y_i = A_{00}X_0 + \ldots + A_{ij}X_j \ldots + A_{nm}X_m \quad (2)$$

A filtering process that removes unnecessary sensor information from the acquired sensor information, an analysis process that estimates the behavior, the condition, and the environment (TPO information) of the user based on the sensor information, and the like can be implemented by performing the calculation process shown by the expressions (1) and (2). For example, if the coefficients A multiplied by the pulse (heart rate), perspiration amount, and body temperature measured values X are set to be larger than the coefficients multiplied by the remaining sensor information measured values, the value Y calculated by the expressions (1) and (2) indicates the "excitement level" that is the state of the user. It is possible to estimate whether the user is seated and talks, talks while walking, thinks quietly, or sleeps by appropriately setting the coefficient multiplied by the speech measured value X and the coefficient multiplied by the foot pressure measured value X. The TPO (time, place, and occasion) information that includes at least one of time information (e.g., year, month, week, day, and time), place information (e.g., position, stay place, and distance) about the user, and condition information (e.g., mental condition, physical condition, and event that has occurred for the user) about the user can be obtained by thus estimating the state of the user.

The state of the user estimated by the state estimation section 106 is the behavior, the condition, or the environment of the user, for example. The behavior of the user may be estimated by determining that the user stands still, walks, runs, sits, lies down, or goes up/down the stairs based on information from the behavior sensor attached to the user, determining the behavior or posture of the user using a sensor (external camera or home sensor) disposed around the user, or determining that the user stays still or moves based on the path of the position of the user determined by a position detection sensor, for example. The condition of the user refers to the mental condition or the physical condition of the user, for example. The condition of the user may be estimated by determining stress, excitement, tension, a health condition, and the like based on information from a biosensor attached to the user. The environment of the user refers to place information, time information, and ambient environment information about the user, for example. The environment of the user may be estimated by determining the place of stay (current location) of the user using a position detection sensor, acquiring the date, the day of the week, and the time using a clock, or acquiring the temperature, atmospheric pressure, illuminance, noise, and the like using an ambient environment sensor, for example. In this case, since it is difficult to accurately specify the state of the user based on the sensor information, the state estimated by the state estimation section 106 may not necessarily be accurate.

The state of the user may be estimated using information other than the sensor information. Specifically, the state of the user may be estimated using the schedule information (schedule data or schedule information) about the user stored in the schedule information storage section 125, or external information acquired through the communication section 138 or the like. For example, the schedule of the user is estimated based on a schedule input by the user, or an accompanying schedule is estimated from the schedule input by the user. Alternatively, the state of the user is estimated based on external information such as information (e.g., today's weather/traffic information) acquired from web information or an external database through the Internet or the like, or information acquired from another user (e.g., message information from another user).

The state estimation accuracy can be improved by utilizing the schedule information or the external information as compared with the case of estimating the state of the user using only the sensor information. For example, the behavior of the user can be estimated with higher accuracy by estimating the behavior of the user using the sensor information and the schedule information in combination.

The usualness level evaluation section 110 evaluates the usualness level (unusualness level) of the user. For example, the usualness level evaluation section 110 evaluates (determines) the usualness level (usual activity level) of the user based on the acquired sensor information and the like. Specifically, the usualness level evaluation section 110 utilizes latitude/longitude information from the GPS sensor, and simply evaluates the usualness level of the user from the experience of stay near that position. Alternatively, when the state estimation section 106 has estimated the state of the user (e.g., current location) based on the acquired sensor information and the like, the usualness level evaluation section 110 may evaluate the usualness level of the user based on the state of the user estimated by the state estimation section 106. Specifically, the usualness level evaluation section 110 determines whether the current state of the user is a usual state or an unusual state to evaluate the usualness level of the user.

Specifically, the usualness level information storage section 124 (usualness level database) stores the usualness level of the user so that the usualness level is linked to the place of stay of the user, or the place and the time zone of stay of the user. For example, the usualness level information storage section 124 stores the usualness level so that the usualness level is linked to each of a plurality of places where the user previously stayed. Alternatively, the usualness level information storage section 124 stores the usualness level so that the usualness level is linked to each combination of the place and the time zone of stay.

The state estimation section 106 specifies the place of stay of the user (e.g., a place where an image was photographed or a place where voice was recorded) when the user acquired the media information. The usualness level evaluation section 110 evaluates the usualness level of the user by reading the usualness level linked to the specified place from the usualness level information storage section 124. The usualness level read from the usualness level information storage section 124 is linked to the media information acquired in the specified place. Alternatively, the state estimation section 106 specifies the place and the time zone of stay of the user when the user acquired the media information. The usualness level evaluation section 110 evaluates the usualness level of the user by reading the usualness level linked to the specified place and time zone from the usualness level information storage section 124. The usualness level read from the usualness level information storage section 124 is linked to the media information acquired in the specified place in the specified time zone.

Note that the state estimation section 106 may specify a stay area or a stay spot that is smaller than the stay area as the place of stay of the user. For example, the state estimation section 106 determines whether or not the user stays within the stay area based on whether or not the standard deviation of the position of the user within a given period is equal to or less than a first threshold value. The state estimation section 106 determines whether or not the user stays within the stay spot based on whether or not the standard deviation of the position of the user within a given period is equal to or less than a second threshold value that is smaller than the first threshold value. Note that the given period for determining the stay area and the given period for determining the stay spot may be the same or different. A place may be divided into three or more stages (granularity) instead of two stages (area of stay and stay spot).

When the stay area and the stay spot have been specified as the place of stay of the user, the usualness level evaluation section 110 evaluates the usualness level of the user by reading the usualness level linked to the specified spot from the usualness level information storage section 124. The usualness level read from the usualness level information storage section 124 is linked to the media information acquired in the specified spot.

Note that the usualness level evaluation section 110 may evaluate the usualness level in various ways. For example, the current usualness level of the user may be evaluated by comparing information about the state history of the user (e.g., state history of the location of the user) with information about the estimated current state (e.g., current location) of the user. The current usualness level of the user may also be evaluated by comparing the predicted behavior of the user with the actual behavior of the user. Note that the term "usualness level" refers to a parameter that indicates the degree of usualness (common or ordinary) of the current state of the user as compared with the past state (state history) of the user, for example. A process that evaluates the usualness level of the user may be considered to be equivalent to a process that evaluates the unusualness level (unusualness or abnormality) of the user.

The write section 112 writes the media information. Specifically, the write section 112 writes the usualness level of the user obtained by the evaluation of the usualness level evaluation section 110 in the media information storage section 122 so that the usualness level is linked to the acquired media information. For example, when the media information is an image, the write section 112 writes the usualness level of the user when the image was acquired (captured or photographed) so that the usualness level is linked to each piece of image data (image file) as meta-information. When the media information is sound (music), the write section 112 writes the usualness level of the user when the sound was acquired (recorded) so that the usualness level is linked to each piece of sound data (music data) as meta-information. In this case, the write section 112 may write the time information (date and time) or the place of stay of the user when the media information was acquired so that the time information or the place of stay of the user is linked to the media information as meta-information.

The search section 114 searches the media information. Specifically, the search section 114 searches the media information stored in the media information storage section 122 using the usualness level of the user linked to the media information. For example, the search section 114 preferentially extracts the media information linked to a low usualness level from media information stored in the media information storage section 122. For example, the search section 114 sorts the media information using the usualness level linked to the media information, and extracts the media information linked to a low usualness level. Therefore, the media information acquired in an unusual state with a low usualness level is preferentially reproduced by the information presentation section 142 or the like.

Suppose that the usualness level evaluation section 110 has evaluated the usualness level of the user by reading the usualness level linked to the place of stay or the place and the time zone of stay of the user from the usualness level information storage section 124, for example. In this case, the search section 114 extracts the media information at an extraction rate that increases as the usualness level of the user with respect to the place of stay of the user when the user acquired the media information decreases. Specifically, the search section 114 extracts the media information acquired in the place of stay of the user for which the usualness level of the user is low at a high extraction rate during the search process, and extracts the media information acquired in the place of stay of the user for which the usualness level of the user is high at a low extraction rate.

The transfer section 116 transfers the media information. Specifically, the transfer section 116 extracts the media information stored in the media information storage section 122 using the usualness level of the user linked to the media information. The transfer section 116 extracts the extracted media information to a second media information storage section 610. For example, the transfer section 116 transfers the media information to the second media information storage section 610 (i.e., an archive storage section provided in an external device (e.g., external server) through the communication section 138. Specifically, the transfer section 116 preferentially extracts the media information linked to a high usualness level from the media information stored in the media information storage section 122. For example, the transfer section 116 sorts the media information using the usualness level linked to the media information, and extracts the media information linked to a high usualness level. The transfer section 116 transfers the extracted media information to the second media information storage section 610 (stores the extracted media information as an archive) while deleting the extracted media information from the media information storage section 122.

Suppose that the usualness level evaluation section 110 has evaluated the usualness level of the user by reading the usualness level linked to the place of stay of the user or the place and the time zone of stay of the user from the usualness level information storage section 124, for example. In this case, the transfer section 116 extracts the media information at an extraction rate that increases as the usualness level of the user with respect to the place of stay of the user when the user acquired the media information increases. Specifically, the transfer section 116 extracts the media information acquired in the place of stay of the user for which the usualness level of the user is high at a high extraction rate during the search process, and extracts the media information acquired in the place of stay of the user for which the usualness level of the user is low at a low extraction rate. The transfer section 116 transfers the extracted media information to the second media information storage section 610.

3. Media Information and Usualness Level

The method according to this embodiment is described in detail below. The user of a digital camera tends to photograph a large number of images since the digital camera makes it easy to take photographs and a large-capacity memory has been developed. Therefore, a large number of images that are not reproduced are generally stored in an HDD of a PC, for example. As a result, the storage capacity of the HDD may be unnecessarily used, or it may be difficult to search the desired image from the photographed images.

On the other hand, the user is generally interested in an image photographed when the user had an unusual experience as compared with an image photographed in a usual situation. For example, when reproducing images photographed using the digital camera, it is considered that the user is interested in an image photographed in a place that the user rarely visits (i.e., happy, unusual, or beautiful memory) as compared with an image photographed in a place familiar to the user (i.e., record). If an image and the like photographed in a situation in which the user got excited and impressed by an unusual experience can be preferentially reproduced, convenience to the user can be improved.

Therefore, this embodiment focuses on the fact that the usualness level (unusualness level) of the user can be determined by estimating the state of the user based on the sensor information and the like, and employs a method that stores the acquired usualness level of the user so that the usualness level is linked to the media information (e.g., image). This makes it possible to preferentially extract and reproduce an image photographed during an unusual experience with a low usualness level, or preferentially extract images photographed during a usual situation with a high usualness level and delete or arrange the extracted images.

Figure 3:
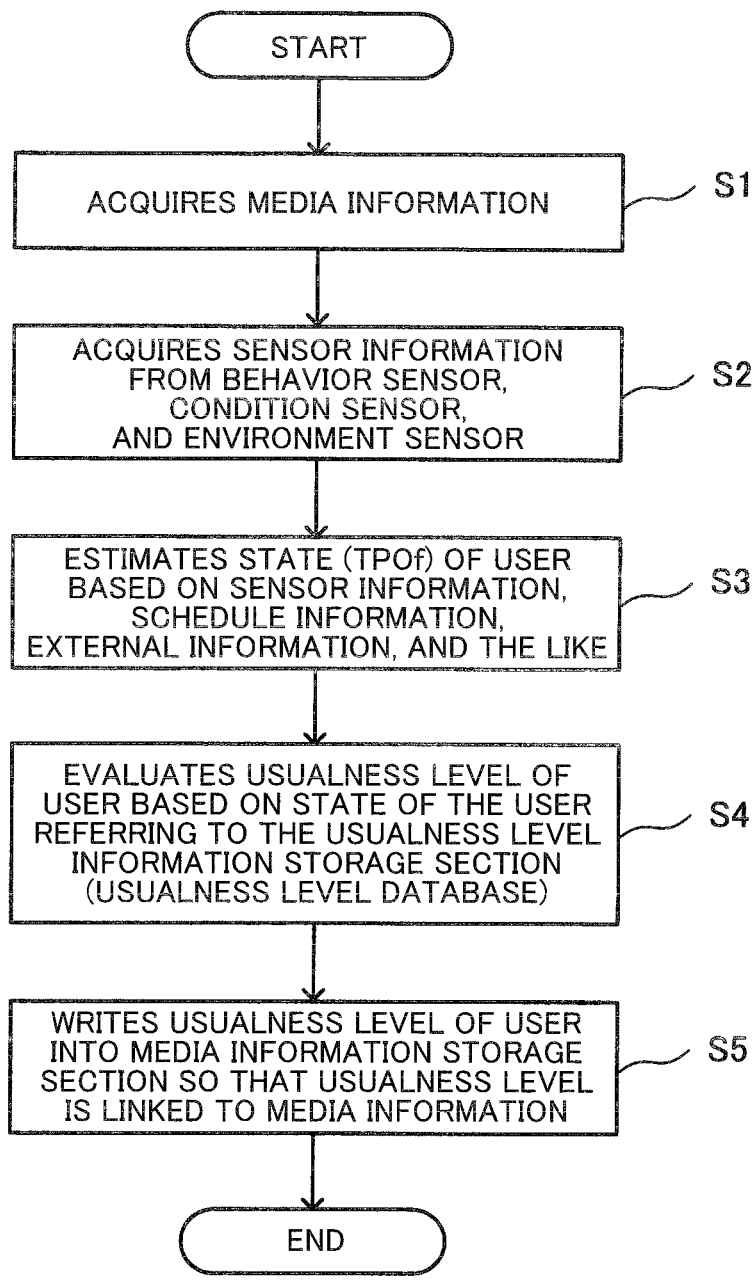
FIG. 3 is a flowchart showing a media information write process.

FIG. 3 is a flowchart showing a media information write process (storage process) according to this embodiment.

The media information (e.g., image or sound) is acquired (step S1). The sensor information from the behavior sensor, the condition sensor, and the environment sensor is then acquired (step S2). The state (TPOf) of the user is estimated based on the acquired sensor information, schedule information about the user, external information acquired from the outside, and the like (step S3).

The usualness level of the user is evaluated based on the estimated state of the user referring to the usualness level information storage section 124 (usualness level database) (step S4). The usualness level of the user is written into the media information storage section 122 so that the usualness level is linked to the media information (step S5). In FIG. 3, the state of the user is estimated in the step S3, and the usualness level is evaluated in the step S4 based on the state of the user. Note that the usualness level may be directly evaluated based on the sensor information and the like without performing the step S3. In the step S5, the media information and the usualness level need not necessarily be written into the media information storage section 122 at the same time. For example, the sensor (or a data logger connected to the sensor) may record the sensor information together with the time, and the usualness level may be determined based on the sensor information and linked to the media information recorded together with the time.

For example, suppose that the user photographed a meeting held in the office. In this case, the time (i.e., date) (T) is estimated to be the daytime on a weekday, the place (P) of stay of the user is estimated to be the office, the occasion (i.e., behavior) (O) is estimated to be during a meeting, and the condition (f) of the user is estimated to be a moderate tension state based on the sensor information, as shown in FIG. 4. Therefore, the state of the user is usual so that the usualness level of the user is determined (evaluated) to be high. Specifically, the usualness level of the state of the user is determined to be high based on the sensor information from the behavior sensor and the biosensor, the schedule information, the external information, and the like. Therefore, when the user has acquired media information in such a state, a high usualness level is linked to the media information.

Note that the place (P) of stay of the user may be specified by specifying the position of the user by utilizing a GPS sensor, a portable telephone position information service, or peripheral wireless LAN position information, and specifying the place of stay of the user by utilizing map information. The occasion (i.e., behavior) (O) of the user may be specified by determining that the user is positioned near the PC by utilizing an RFID or the like, estimating the behavior of the user from the time (T) and the place (P), or estimating the behavior of the user to a certain extent, and allowing the user to select one of displayed options.

For example, suppose that the user had dinner with a friend at a nearby hotel after leaving the office, and taken a commemorative photograph. In this case, the time (i.e., date) (T) is estimated to be night (after regular time) on a weekday, the place (P) of stay of the user is estimated to be a hotel near the office, the occasion (behavior) (O) is estimated to be at dinner, and the condition (f) of the user is estimated to be a relaxed state, as shown in FIG. 4. Therefore, the usualness level of the user is determined (evaluated) to be medium. When the user has acquired media information in such a state, a medium usualness level is linked to the media information.

For example, suppose that the user visited a sightseeing spot on a holiday and photographed a landscape. In this case, the time (i.e., date) (T) is estimated to be the daytime on a holiday, the place (P) of stay of the user is estimated to be a sightseeing spot, the occasion (i.e., behavior) (O) is estimated to be walking, and the condition (f) of the user is estimated to be a moderate excited state. Therefore, the usualness level of the user is determined (evaluated) to be low (unusual). When the user has acquired media information in such a state, a low usualness level is linked to the media information.

The usualness level information storage section 124 stores the usualness level corresponding to the place of stay of the user, or the place and the time zone of stay of the user. In the example shown in FIG. 4, the usualness level information storage section stores the usualness level so that the usualness level is linked to the office (place of stay), or stores the usualness level so that the usualness level is linked to the office (place of stay) and the daytime on a weekday (time zone of stay). The state estimation section 106 specifies the place of stay of the user or the place and the time zone of the user when the user acquired the media information, and the usualness level evaluation section 110 evaluates the usualness level of the user by reading the usualness level linked to the specified place or the specified place and time zone from the usualness level information storage section 124. In the example shown in FIG. 4, when the state estimation section 106 has specified that the place of stay of the user is the office, or specified that the place of stay of the user is the office and the time zone of stay is the daytime on a weekday, the usualness level evaluation section 110 evaluates that the usualness level of the user is high.

FIG. 5 shows an example of the data structure (table) of the media information storage section 122. In FIG. 5, various types of meta-information are linked to an image file (JPEG file) that is the media information. Specifically, the date when the image was photographed, the latitude and longitude when the image was photographed, and the place (area or spot) of stay of the user specified from the latitude and longitude are linked to the image file as the meta-information. The usualness level of the user when the image was photographed is also linked as the meta-information. Note that the meta-information such as the usualness level may be linked in a table format (see FIG. 5), or may be written into a given area of the image file, for example.

In FIG. 5, since the Nikko Toshogu shrine is a sightseeing spot that the user rarely visits, the usualness level of the user is determined to be low (i.e., the behavior is determined to be unusual), as described with reference to FIG. 4. Therefore, the usualness level "1" is linked to the image file photographed when the user stayed at the Nikko Toshogu shrine, for example. In this example, the value (parameter) of the usualness level decreases as the usualness level decreases.

In FIG. 5, when the user stays in the office in Shinjuku in the daytime on a weekday (i.e., usual), the usualness level of the user is determined to be high, as described with reference to FIG. 4. Therefore, the usualness level "10" is linked to the image file photographed when the user stayed in the office in Shinjuku in the daytime on a weekday, for example. When the user stays at a hotel near the office at night on a weekday, the usualness level of the user is determined to be medium. Therefore, the usualness level "5" is linked to the image file photographed when the user stayed at a hotel near the office at night on a weekday, for example.

When the user was in the office in Shinjuku in the daytime on a holiday, for example, the usualness level of the state of the user is determined to be low. Specifically, the usualness level can be appropriately evaluated by evaluating the place of stay of the user and the time zone in combination when evaluating the usualness level.

If the usualness level in Shinjuku where the user's office is situated is determined based on a large area of stay described later, whether the user is in the office or the hotel near the office cannot be determined so that the usualness level may not be accurately evaluated. However, such a situation can be prevented by determining the usualness level based on a stay spot (described later) or the like that is smaller than the stay area.

Figure 6:
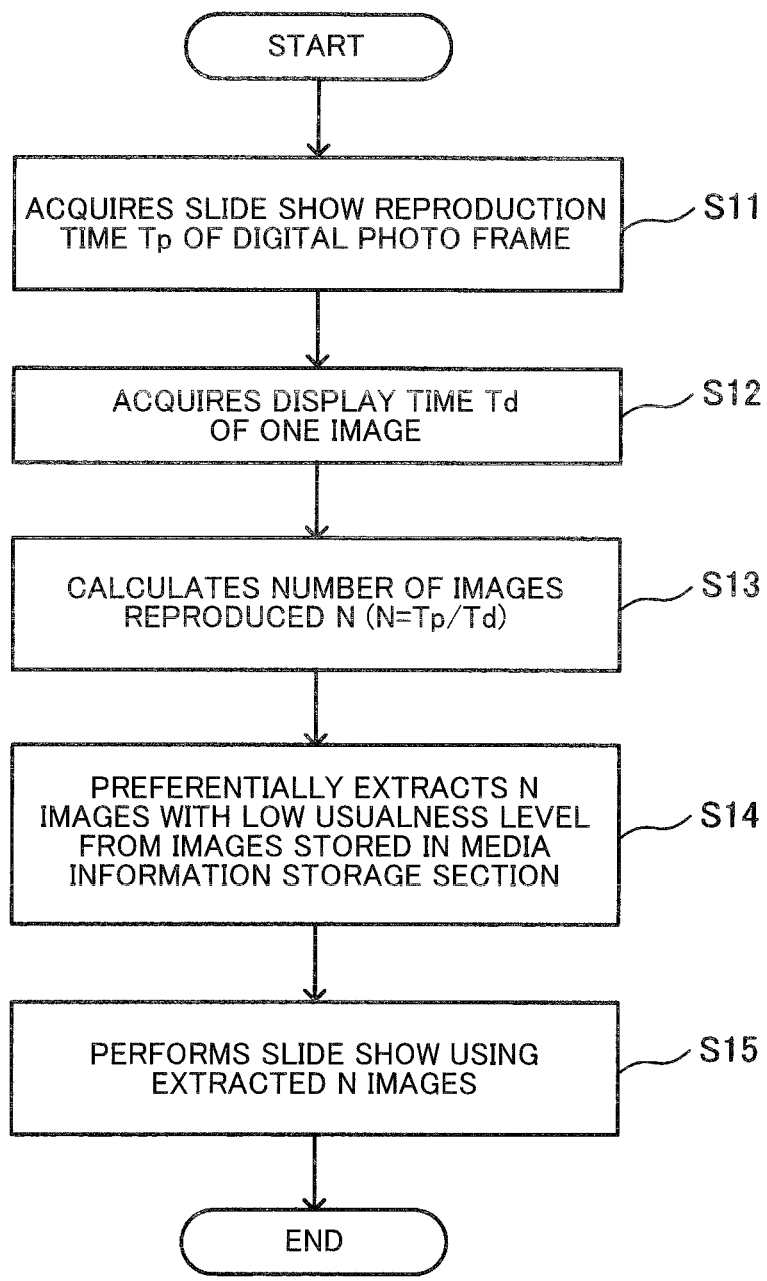
FIG. 6 is a flowchart illustrative of a media information search process.

A method of utilizing the media information linked to the usualness level is described below. FIG. 6 is a flowchart showing a process that reproduces the image file shown in FIG. 5 using an image reproduction device such as a digital photo frame.

A slide show reproduction time Tp (total reproducing time) of the digital photo frame and a display time Td of one image are acquired (steps S11 and S12). The reproduction time Tp and the display time Td may be input by the user, or may be set by the system.

The number of images reproduced (N=Tp/Td) is calculated based on the acquired reproduction time Tp and display time Td (step S13). N images with a low usualness level are extracted from the images stored in the media information storage section 122 (step S14). The digital photo frame then performs a slide show using the extracted N images (step S15).

In FIG. 6, the images acquired when the usualness level of the user was low are preferentially extracted from the images (media information in a broad sense) stored in the media information storage section 122. Therefore, a photograph taken during sightseeing (i.e., unusual experience) is preferentially reproduced, while a usual documentary photograph or the like is not reproduced. This makes it possible to allow the user to recollect the past unusual experience by seeing the reproduced image, and prompt the user to change his usual life pattern. Moreover, the user can recollect the past experience by easily reproducing the stored images. This makes it possible to effectively utilize the stored images, and provide a novel digital photo frame.

Figure 7:
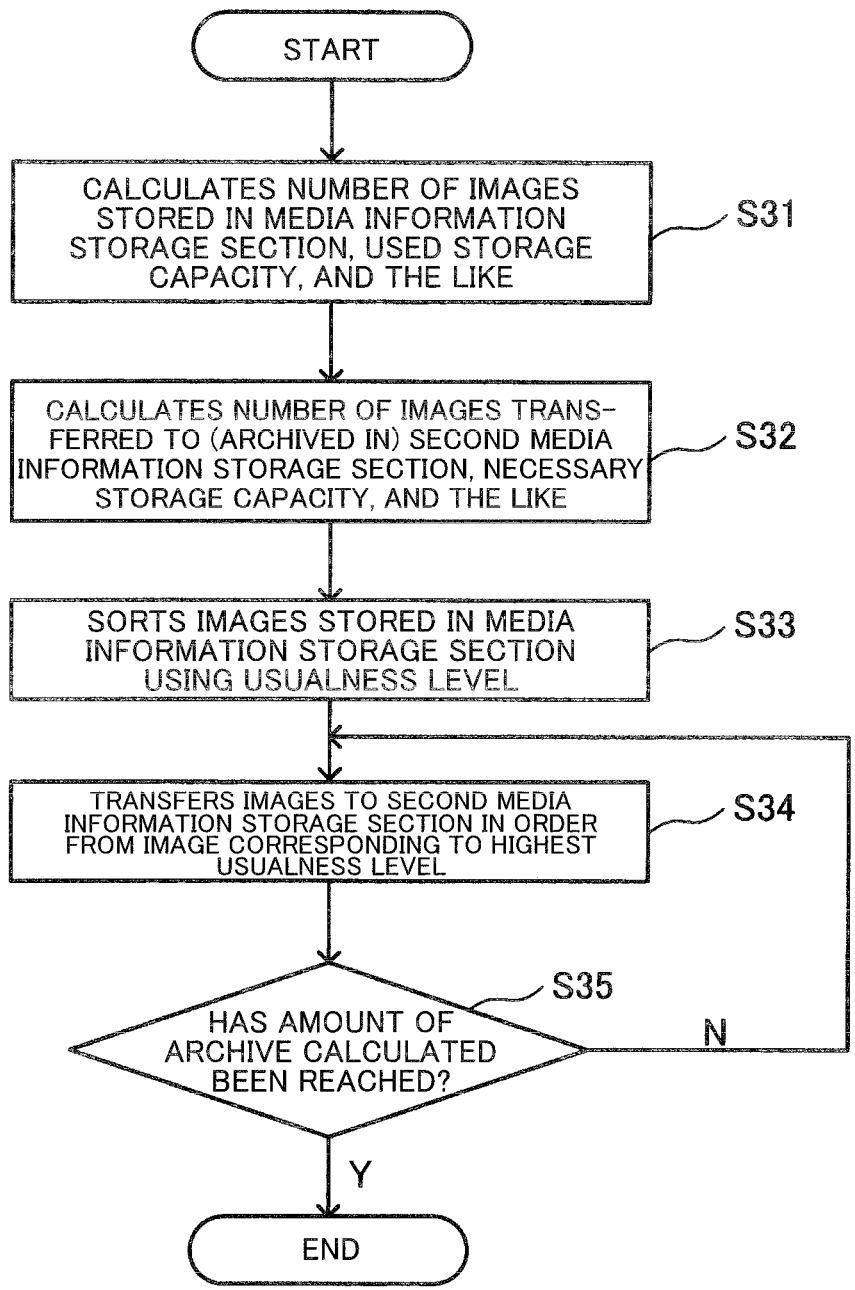
FIG. 7 is a flowchart illustrative of a media information transfer process.

Another method of utilizing the media information linked to the usualness level is described below. FIG. 7 is a flowchart showing a process that efficiently extracts an image that is considered to be unnecessary from the image files shown in FIG. 5 and transfers (archives) the extracted image in the second media information storage section 610.

The number of images stored in the media information storage section 122, the used storage capacity of the media information storage section 122, and the like are calculated (step S31). Specifically, the available storage capacity of the media information storage section 122 and the like are determined. The number of images transferred to the archive second media information storage section 610 and the necessary storage capacity are calculated based on the calculation results (step S32). Specifically, the number of images to be transferred and the necessary memory capacity are calculated so that so that the media information storage section 122 has a sufficient free storage capacity.

The images stored in the media information storage section 122 are sorted using the usualness level linked to each image as shown in FIG. 5 (step S33). For example, the images are stored so that the images are arranged in the order from the image linked to the highest usualness level. The images are sequentially transferred (moved) to the second media information storage section 610 in the order from the image linked to the highest usualness level to archive the images (step S34). In this case, the image transferred to the second media information storage section 610 is deleted from the media information storage section 122. The transfer operation in the step S34 is repeated until the amount of archive calculated in the step S32 is reached (step S35).

In FIG. 7, the images acquired when the usualness level of the user was high are preferentially extracted from the images (media information) stored in the media information storage section 122, and the extracted images are transferred to the second media information storage section 610 and deleted from the media information storage section 122. Therefore, a photograph taken during sightseeing (i.e., unusual experience) remains, while a usual documentary photograph or the like is archived (stored in a library), as shown in FIG. 5. Specifically, a usual documentary photograph or the like is transferred from the media information storage section 122 to the archive second media information storage section 610 (i.e., a storage section having a capacity larger than that of the media information storage section 122), and stored in the second media information storage section 610. This enables the user to archive the images that are included in the stored images and were photographed in a usual state (i.e., rarely reproduced) in the second media information storage section 610. This makes it possible to efficiently arrange the stored images, and prevents a situation in which the storage capacity of the media information storage section 122 is occupied by the stored images. In this case, since the images photographed in an unusual state are not archived, these images can be easily reproduced without reading the images from the second media information storage section 610 so that the user can recollect an unusual experience. In particular, the images photographed during an unusual experience can be preferentially allowed to remain in the media information storage section 122 by combining the method shown in FIG. 6 with the method shown in FIG. 7 so that the user can easily reproduce and enjoy watching the images as desired.

For example, such an archive service may be implemented by providing the second media information storage section 610 in an external server. Specifically, the user who uses the service transfers media information such as an image to an external server managed by the service provider through the Internet or the like using the method shown in FIG. 7, and stores the images in the second media information storage section 610 provided in the external server. In this case, the user is charged corresponding to the amount of data stored. This makes it possible to provide a novel data archive service.

Note that the media information search process and the media information transfer process based on the usualness level are not limited to the processes shown in FIGS. 6 and 7. Various modifications may be made.

In FIG. 8A, when the user who lives in Tokyo went to London on a sightseeing trip and stays in London (i.e., unusual), the usualness level N of the user is determined to be low (N=1). When the user made a business trip to Osaka and stays in Osaka, the usualness level N is determined to be "4". When the user stays in Shinjuku where the office is situated, the usualness level N is determined to be "10". In FIG. 8A, the media information extraction rate is set corresponding to the usualness level.

Note that the term "extraction rate" refers to the ratio of the number of pieces of media information extracted to the total number of pieces of media information acquired in the place of stay, for example. For example, since the usualness level is low when the user stays in London, the extraction rate is set to be high (e.g., 100%). On the other hand, since the usualness level is high when the user stays in Shinjuku, the extraction rate is set to be low (e.g., 5%).

The extraction rate shown in FIG. 8A is used when extracting the reproduction target media information from the media information stored in the media information storage section 122. For example, if the user took 100 photographs when the user stayed in London, since the usualness level linked to the photographs is "1" and the extraction rate is set to be 100%, all of the 100 photographs are extracted. If the user took 50 photographs when the user stayed in Osaka, since the usualness level linked to the photographs is "4" and the extraction rate is set to be 70%, 35 photographs are extracted. If the user took 200 photographs when the user stayed in Shinjuku, since the usualness level linked to the photographs is "10" and the extraction rate is set to be 50%, 10 photographs are extracted. According to the method shown in FIG. 8A, the media information is extracted at an extraction rate that increases as the usualness level of the user with respect to the place of stay of the user when the user acquired the media information decreases.

FIG. 8B shows an extraction rate setting example during archive transfer. The extraction rate shown in FIG. 8B is used when extracting the media information to be transferred to the second media information storage section 610 from the media information stored in the media information storage section 122. For example, if the user took 100 photographs when the user stayed in London, the extraction rate during transfer is set to be 0%, since the photographs taken in London are precious photographs in an unusual state. Therefore, the photographs taken in London are not transferred to the second media information storage section 610 as an archive. If the user took 50 photographs when the user stayed in Osaka, the usualness level N is "4", and the extraction rate during transfer is set to be 20%. Therefore, 10 photographs are transferred to the second media information storage section 610. If the user took 200 photographs when the user stayed in Shinjuku, the usualness level N is "10", and the extraction rate during transfer is set to be 60%. Therefore, 120 photographs are transferred to the second media information storage section 610. According to the method shown in FIG. 8B, the media information is extracted at an extraction rate that increases as the usualness level of the user with respect to the place of stay of the user when the user acquired the media information increases, and transferred to the second media information storage section 610. It is possible to employ a configuration that allows the user to prevent a desired photograph from being transferred to the second media information storage section 610 when taking a photograph.

4. Second System Configuration Example

Figure 9:
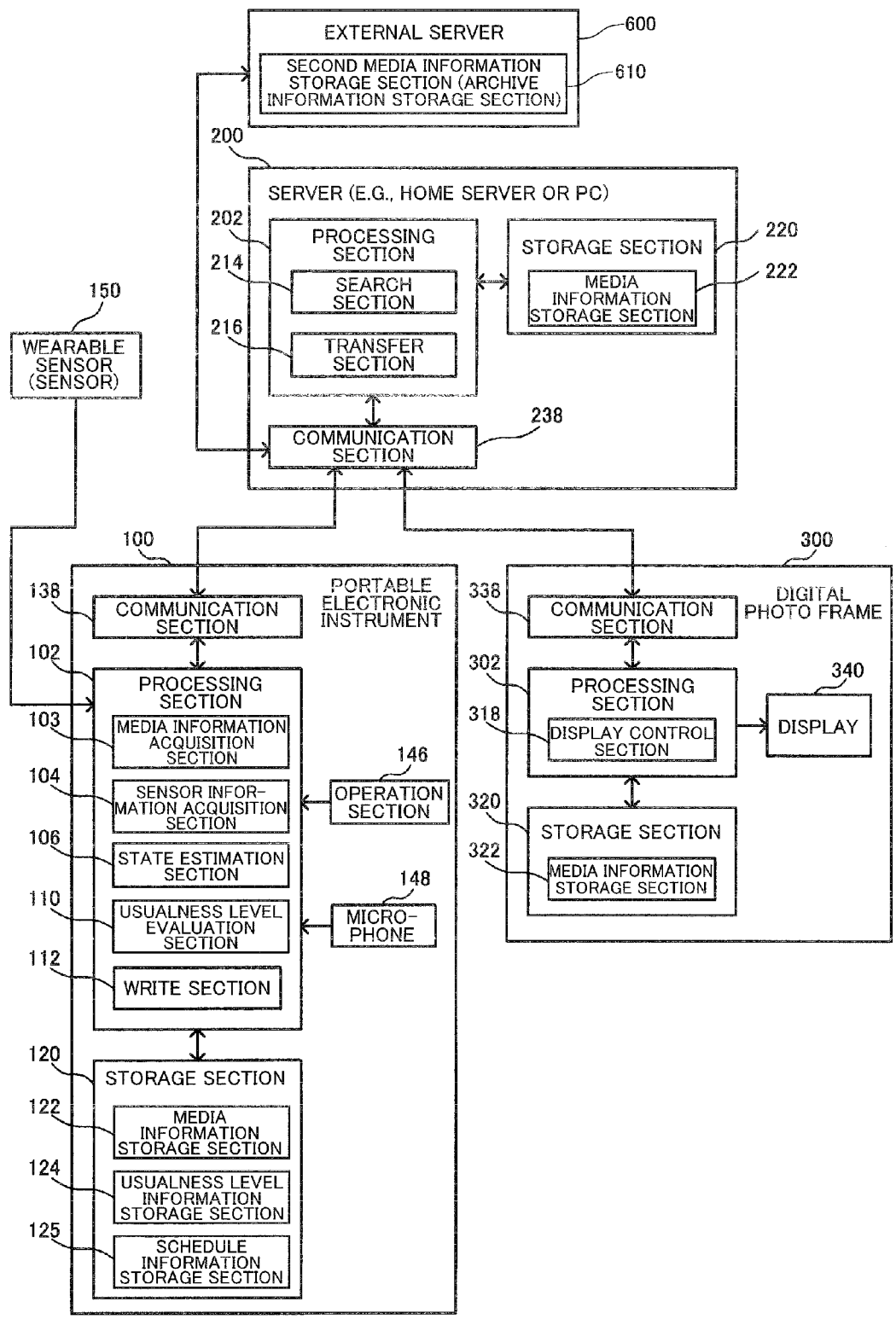
FIG. 9 shows a second system configuration example according to one embodiment of the invention.

FIG. 9 shows a second system configuration example according to this embodiment. A system shown in FIG. 9 includes a server 200 (home server or PC). The portable electronic instrument 100 and the server 200 are connected via the Internet, a wireless LAN, or the like. In FIG. 9, the portable electronic instrument 100 carried by the user mainly estimates the state of the user, evaluates the usualness level, and writes the media information. The search process and the transfer process described with reference to FIGS. 6 to 8B are mainly performed by a search section 214 and a transfer section 216 of a processing section 202 of the server 200. The searched image reproduction process (slide show) is performed by a processing section 302 of a digital photo frame 300. Specifically, a display control section 318 of the digital photo frame 300 controls a display 340 to implement a slide show described with reference to FIG. 6. Note that the server 200 may estimate the state of the user, evaluate the usualness level, and write the media information, and the digital photo frame 300 may search the media information.

In FIG. 9, the media information acquisition section 103 of the portable electronic instrument 100 acquires the media information such as an image captured by the imaging section 146 and sound recorded through the microphone 148. The sensor information acquisition section 104 acquires the sensor information from the behavior sensor, the condition sensor, or the environment sensor of the wearable sensor 150. The state estimation section 106 estimates the state of the user based on the acquired sensor information, the schedule information stored in the schedule information storage section 125, external information received from the server 200 or an external server 600, and the like. The usualness level evaluation section 110 evaluates the usualness level of the user referring to the usualness level information storage section 124, and the write section 112 writes the usualness level in the media information storage section 122 so that the usualness level is linked to the acquired media information (e.g., image or sound).

The media information linked to the usualness level is transmitted to the server 200 through the communication section 138, and the server 200 receives the media information through a communication section 238. The received media information is stored in a media information storage section 222 of the server.

The search section 214 of the server extracts the media information reproduced by the digital photo frame 300 from the media information stored in the media information storage section 222 of the server. Specifically, the search section 214 searches the media information stored in the media information storage section 222 using the usualness level of the user linked to the media information, and preferentially extracts the media information acquired when the usualness level of the user was low. The extracted media information is transmitted to the digital photo frame 300 through the communication section 238, and received by the digital photo frame 200 through a communication section 338. The received media information is stored in a media information storage section 322 of the digital photo frame.

The display control section 318 of the digital photo frame 300 then displays an image on the display 340 based on the image data (i.e., media information) written into the media information storage section 322. Specifically, the display control section 318 reproduces the image by performing a slide show described with reference to FIG. 6. When the media information includes sound data, the sound is reproduced by a speaker (not shown) or the like.

The transfer section 216 of the server 200 extracts the media information using the usualness level of the user linked to the media information stored in the media information storage section 222, and transfers the extracted media information to the second media information storage section 610. Specifically, the transfer section 216 extracts the media information acquired when the usualness level of the user is high from the media information stored in the media information storage section 222. The transfer section 216 transfers the extracted media information to the second media information storage section 610 while deleting the extracted media information from the media information storage section 222. Specifically, the transfer section 216 transfers the extracted media information to the external server 600 through the communication section 238, and the external server 600 stores the received media information in the second media information storage section 610 (i.e., archive information storage section).

The media information can thus be archived as described with reference to FIG. 7 so that a situation in which the storage capacity of the media information storage section 222 of the server 200 is occupied by the stored images can be prevented. When reproducing the media information stored in the second media information storage section 610 in response to a user's request or the like, the media information is received from the external server 600, and again stored in the media information storage section 222 of the server 200, or transferred to the digital photo frame 300.

Figure 10A:
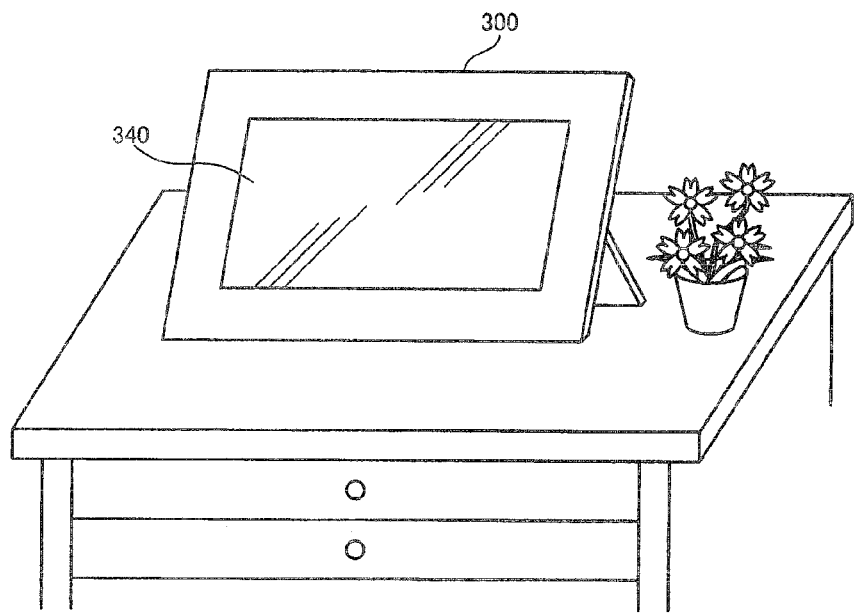
FIGS. 10A and 10B are views illustrative of a digital photo frame.

FIG. 10A shows an example of the digital photo frame 300 (digital photo player or image reproduction device). FIG. 10A shows an example of a photo stand-type digital photo frame. The digital photo frame 300 is set up by the user in an arbitrary place in a house or the like. The digital photo frame 300 reproduces (image reproduction or sound reproduction) the media information (e.g., digital image data or digital sound data) stored in the media information storage section 322 of a storage section 320. The digital photo frame 300 can automatically reproduce the media information stored in the media information storage section 322 even if the user does not issue a reproduction instruction. For example, the digital photo frame 300 automatically displays a photo slide show (see FIG. 6), or automatically reproduces a video.

The digital photo frame 300 may be a wall-hanging digital photo frame instead of a photo stand-type digital photo frame (see FIG. 10A), for example. A media information reproduction button or the like may be provided in the digital photo frame 300, or the digital photo frame 300 may be configured so that the user can issue a reproduction instruction using a remote controller.

The digital photo frame 300 may include a memory card (e.g., SD card) interface. Alternatively, the digital photo frame 300 may include a wireless communication interface (e.g., wireless LAN or Bluetooth) or a cable communication interface (e.g., USB). For example, when the user has stored media information (media information linked to the usualness level) in a memory card and inserted the memory card into a memory card interface of the digital photo frame 300, the digital photo frame 300 automatically reproduces the media information stored in the memory card (e.g., displays a slide show). Alternatively, when the digital photo frame 300 has received media information from the outside via wireless communication or cable communication, the digital photo frame 300 reproduces the media information (automatic reproduction process). For example, when the portable electronic instrument 100 (e.g., digital camera or portable telephone) possessed by the user has a wireless communication function (e.g., Bluetooth), the media information is transferred from the media information storage section 122 of the portable electronic instrument to the media information storage section 322 of the digital photo frame 300 by utilizing the wireless communication function. The digital photo frame 300 reproduces the media information transferred from the portable electronic instrument 100.

Figure 10B:
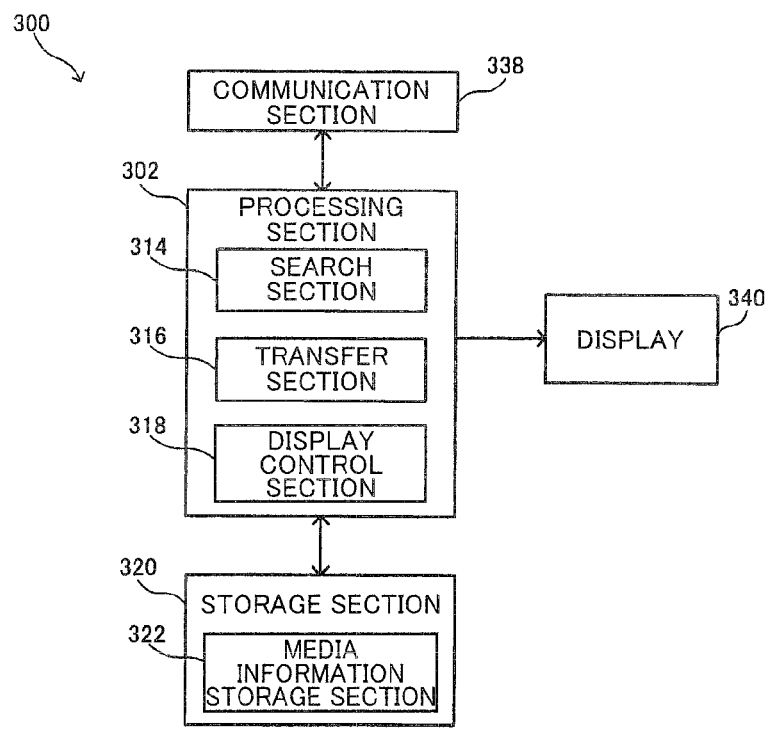

FIG. 10B shows a configuration example of the digital photo frame 300. The digital photo frame 300 includes a processing section 302 that performs various processes, a communication section 338 that implements wireless or cable communication, the storage section 320, and a display 340. Note that various modifications may be made, such as omitting some of these elements or adding other elements.

The processing section 302 may be implemented by a processor (e.g., CPU), a display control ASIC, or the like. The storage section 320 may be implemented by a RAM, an HDD, or the like. When the media information is stored in a memory card and automatically reproduced, the storage section 320 may be implemented by a memory card. The display 340 may be implemented by a liquid crystal display, a display that utilizes a light-emitting element (e.g., organic EL element), an electrophoretic display, or the like.

In FIG. 10B, the processing section 302 includes a search section 314, a transfer section 316, and a display control section 318.

The search section 314 preferentially extracts the media information acquired when the usualness level of the user was low from the media information stored in the media information storage section 322.

The transfer section 316 extracts the media information stored in the media information storage section 322 using the usualness level of the user linked to the media information, and transfers the extracted media information to the external second media information storage section 610. Specifically, while the server 200 performs the search process and the transfer process in FIG. 9, the digital photo frame 300 performs the search process and the transfer process in the example shown in FIG. 10B.

The display control section 318 displays an image on the display 340 based on the image data (i.e., media information). For example, the display control section 318 decodes compressed image data, and reproduces the decoded image data.

It is possible to extract images from a large number of images photographed by the user based on the usualness level and reproduce the extracted images by utilizing the digital photo frame 300 shown in FIGS. 10A and 10B. Since an image photographed during an unusual experience can be preferentially extracted and reproduced, it is possible to prompt the user who unintentionally watches the image automatically reproduced by the digital photo frame 300 to change the usual life pattern, for example.

5. Usualness Level Evaluation Process

A specific example of the usualness level evaluation process is described below. It is necessary to specify the place of stay of the user in each time zone in order to evaluate the usualness level of the user, as described with reference to FIG. 5. However, position data (latitude and longitude) obtained by the GPS sensor or the like is not information that directly indicates the place of stay of the user. Therefore, it is important to specify a place meaningful to the user from the position data.

For example, a place meaningful to the user can be extracted by categorizing the place of stay of the user based on the stay time. FIG. 17 shows a heat map when the user who arrived at a station walked around the station, and stayed in a department store A, a crepe shop B, a movie theater C, a family restaurant D, a general shop E, and a bookstore F, for example. The distribution of the position of the user in each place of stay can be determined by utilizing the GPS sensor or the like. The extent and the density of the distribution differ corresponding to the place of stay of the user. In the heat map shown in FIG. 11, a place where the user stayed for a long time is densely displayed, and the distribution of the place corresponds to the behavior of the user.

As described with reference to FIG. 5, if the usualness level is evaluated based on a wide area when the user stays in a city such as Shinjuku, since a plurality of places that differ in meaning (e.g., office, tavern, and department store) are present in a single area, the usualness level may not be accurately evaluated. On the other hand, when the user visits a place (e.g., sightseeing spot) where the user takes a walk without staying in a specific place for a long time, a place meaningful to the user may not be extracted when using a narrow area, so that the usualness level may not be evaluated.

In this embodiment, an area/spot concept is employed as the place of stay of the user, as shown in FIGS. 12A and 12B. As shown in FIG. 12A, the stay area is larger than the stay spot. As shown in FIG. 12B, a stay spot that is smaller than the stay area is situated in each area of stay. In this embodiment, the stay spot and the stay area are extracted by the following method.

For example, the stay area is an area for which the position standard deviation σ within a given period T1 is equal to or less than a first threshold value Sth1 (several hundreds to 1000 m). On the other hand, the stay spot is an area for which the position standard deviation σ within a given period T2 is equal to or less than a second threshold value Sth2 (e.g., several tens to 100 m). In this embodiment, the stay area and the stay spot are extracted by statistically processing information obtained by a position detection sensor such as the GPS sensor worn by the user.

Suppose that the average latitude/longitude and the standard deviation within the given period T1 (e.g., four hours) are (Nμ, Eμ) and (Nσ, Eσ). In this case, a stay area meaningful to the user shown in FIG. 12A can be extracted by converting the standard deviation (Nσ, Eσ) into distance, and extracting an area in which the north-to-south and east-to-west standard deviations are equal to or less than the threshold value Sth1 (e.g., 1 km). The stay spot shown in FIG. 12B can be extracted by performing a process similar to the above process while reducing the distance threshold value Sth to Sth2 (e.g., several tens of meters).

According to this embodiment, whether or not the user stays within the stay area is determined based on whether or not the standard deviation σ of the position of the user within the given period T1 is equal to or less than the first threshold value Sth1. On the other hand, whether or not the user stays within the stay spot is determined based on whether or not the standard deviation σ of the position of the user within the given period T2 is equal to or less than the second threshold value Sth2.

For example, the position standard deviation σ is calculated by statistically processing the position (latitude and longitude) of the user from a time (t−T1) to a time t. When the calculated standard deviation σ is equal to or less than the first threshold value Sth1, it is determined that the user stayed within the area in the time zone from the time (t−T1) to the time t. Likewise, the position standard deviation σ is calculated by statistically processing the position of the user from a time (t−T2) to the time t. When the calculated standard deviation σ is equal to or less than the second threshold value Sth2, it is determined that the user stayed within the spot in the time zone from the time (t−T2) to the time t. Note that T1 may be equal to T2. The stay area and the stay spot may be extracted by observing the position of one user for a long time and statistically processing the position of the user, or may be extracted by observing the positions of a plurality of users and statistically processing the positions of the users.

Figure 13:
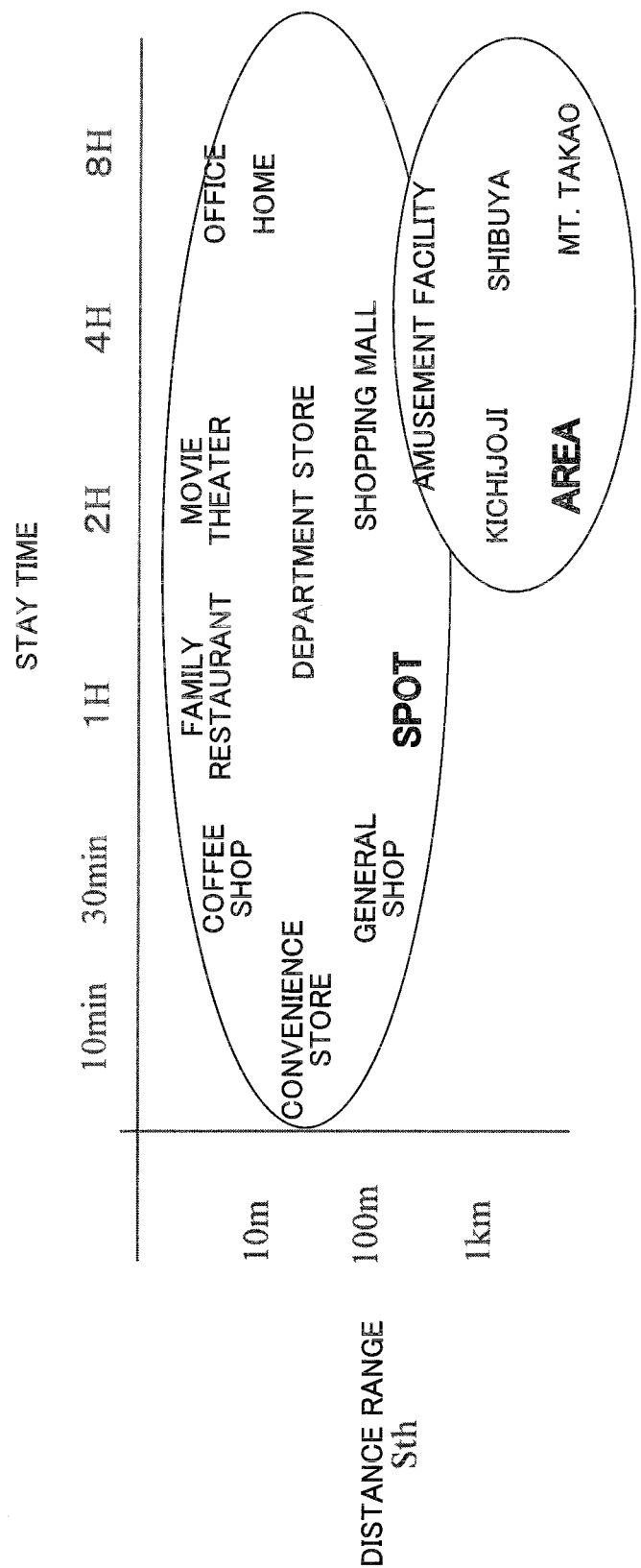
FIG. 13 is a view showing a stay time and a distance range of each spot and each area.

As shown in FIG. 13, the average stay time and the distance range differ corresponding to each spot and each area, for example. Therefore, the properties of the spot and the area can be categorized to some extent by appropriately setting the time of stay and the distance range. Specifically, since the granularity of the area differs corresponding to the place and the category, such categorization is effective for evaluating the usualness level and the like. In FIG. 13, the distance range and the stay time of a coffee shop are respectively about 10 m and about 30 minutes, for example. The distance range and the stay time of a movie theater are respectively about 10 m and about two hours (i.e., longer than that of the coffee shop). The distance range and the stay time of a general shop are respectively about 100 m (i.e., larger than that of the coffee shop) and about 30 minutes. The stay time of a shopping mall is about four hours. The distance range of the area increases as compared with the spot, and the stay time of the area also relatively increases. The meaning of the place that cannot be extracted based on only the position data can be extracted by investigating the distance range and the stay time.

For example, if the threshold values Sth (distance range) is set to be several tens of meters, only a place where the user is seated and spends some time can be extracted. A place where the user moves in a building can be extracted by increasing the threshold values Sth. A place where the user moves in facilities, a large park, a city or a sightseeing spot where the user takes a walk, a mountain where the user hikes, and the like can be extracted by further increasing the threshold values Sth.

When the threshold values Sth is increased, an area that includes some spots is extracted. In this case, it is impossible to determine whether the user is in the office in Shinjuku or a tavern in Shinjuku, so that the usualness level cannot be appropriately evaluated. Therefore, it is desirable to evaluate the usualness level by utilizing the area and the spot in combination.

In FIG. 14, the probability that the user stays in the area/spot (area of stay/stay spot) thus extracted is calculated. In this case, since the meaning of the place of stay differs for the user corresponding to the day of the week and the time zone, the probability is separately calculated in FIG. 14 corresponding to a weekday, a holiday, daytime, and day and night. The ratio of the stay time in each area and each spot within the latest 30 days may be linked to the probability that user stays in each area and each spot, for example.

In FIG. 14, the probability that the user stays at home in the daytime on a weekday is low, while the probability that the user stays at home in the morning and night on a weekday is high. The probability that the user stays at home in the daytime on a holiday increases to some extent, and the probability that the user stays at home in the morning and night on a holiday further increases.

The probability that the user stays in the office in the daytime on a weekday is high while the probability that the user stays in the office in the morning and night on a weekday is low. The probability that the user stays in the office on a holiday is low.

As shown in FIG. 15A, the probability obtained in FIG. 14 may be assigned to a usualness level N (i.e., a value used to calculate the usualness level). The usualness level may be calculated based on the probability while taking account of the state, emotion, and the like.

For example, the usualness level of the user with respect to each place may be evaluated by normalizing the stay time in each area and each spot by the average stay time in each place. This prevents a situation in which the usualness level with respect to a convenience store or the like where the user stays for a short time is calculated to be low.

As shown in FIG. 15B, the usualness level N may be calculated based on the probability that is defined based on the number of times that the user was present in a spot or an area within a given period (e.g., 1 to 3 months).

The usualness level information storage section 124 (usualness level database) may be implemented by the combination of FIGS. 14 and 15A or the combination of FIGS. 14 and 15B. For example, the usualness level information storage section 124 stores the usualness level as shown in FIGS. 15A and 15B so that the usualness level is linked to the place of stay of the user (e.g., area and spot) shown in FIG. 14. Alternatively, the usualness level information storage section 124 may store the usualness level so that the usualness level is linked to the place of stay of the user (e.g., area and spot) and the time zone of stay (e.g., daytime on weekday, day and night on weekday, daytime on holiday, and day and night on holiday). When the place of stay of the user (e.g., area and spot) has been specified, or the time zone of stay (e.g., daytime on weekday or day and night on weekday) has been specified in addition to the place of stay of the user, the usualness level of the user can be evaluated by reading the usualness level from the usualness level information storage section 124 that is implemented by the combination of FIGS. 14 and 15A or the combination of FIGS. 14 and 15B.

6. Another Example of Usualness Level Evaluation Process

Figure 16:
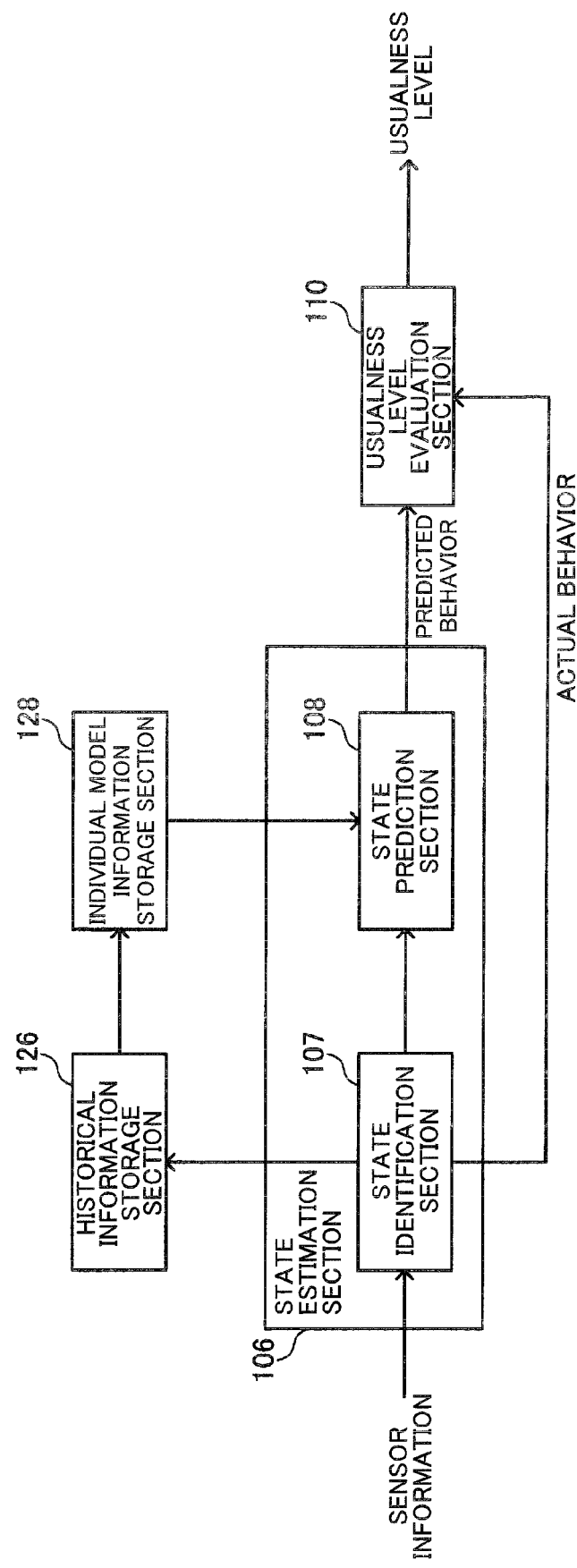
FIG. 16 is a view illustrative of another example of the usualness level evaluation method.

Another example of the usualness level evaluation process is described below with reference to FIG. 16, etc. In FIG. 16, the state estimation section 106 includes a state identification section 107 and a state prediction section 108.

The state identification section 107 identifies (estimates) the state (e.g., behavior, condition, and environment) of the user based on the sensor information from the behavior sensor, the condition sensor, and the environment sensor, and the like. The historical information (log information) about the state of the user is stored in the historical information storage section 126. The hobby, the preference, the behavior tendency, and the like of the user are constructed as an individual model by analyzing the state historical information stored in the historical information storage section 123, and the individual model is stored in an individual model information storage section 128 (individual model database).

A probability model may be used as the individual model. Examples of the probability model include a hidden Markov model. In the hidden Markov model (HMM), the system assumes that the parameter is an unknown Markov process, and estimates the unknown parameter from observable information. Specifically, the HMM is a probability model that estimates the state transition inside the system from the symbol probability distribution on the assumption that a system has an internal state that transitions according to the Markov process, and stochastically outputs a symbol corresponding to each state. Since only a symbol series can be externally observed, and the internal state transition cannot be directly observed, this probability model is referred to as a "hidden" probability model.

The state prediction section 108 predicts the subsequent behavior (state in a broad sense) of the user based on the individual model information (state historical information). The state identification section 107 identifies the actual behavior of the user. The usualness level evaluation section 110 determines the degree of coincidence between the identified actual behavior of the user and the behavior of the user predicted based on the preceding state and the individual model to evaluate the usualness level.

Figure 17A:
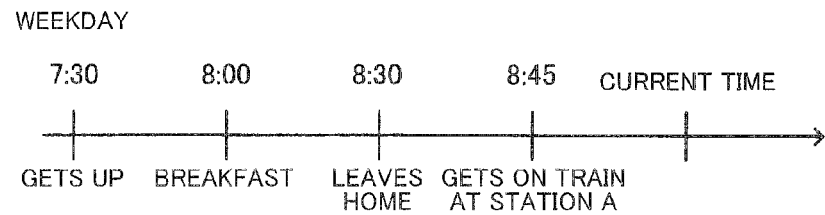
FIGS. 17A to 17D are views illustrative of another example of the usualness level evaluation method.
Figure 17B:
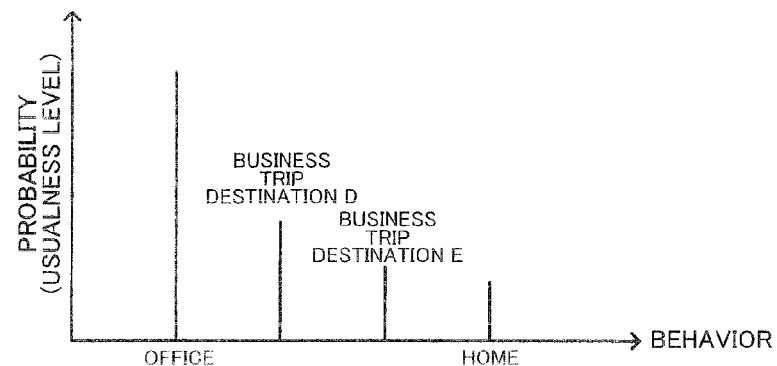

The usualness level evaluation method shown in FIG. 16 is described in detail below with reference to FIGS. 17A to 17D. FIG. 17A shows an example of the state history (behavior history) of the user on a weekday. On a weekday, the user gets up at 7:30 AM, has breakfast at 8:00 AM, leaves home at 8:30 AM, and gets on a train at the station A near home at 8:45 AM. The state prediction section 108 predicts the subsequent behavior of the user based on the state history of the user.

The state prediction section 108 predicts that the user goes to the office with the highest probability (see FIG. 17B) based on the state history shown in FIG. 17A. When the actual behavior of the user identified by the state identification section 107 is going to the office, the usualness level evaluation section 110 evaluates that the usualness level of the user is high. When the user has immediately returned home due to an emergency or the like (i.e., the identified actual behavior of the user is coming home), the usualness level evaluation section 110 evaluates that the usualness level of the user is low (i.e., unusual).

Figure 17C:
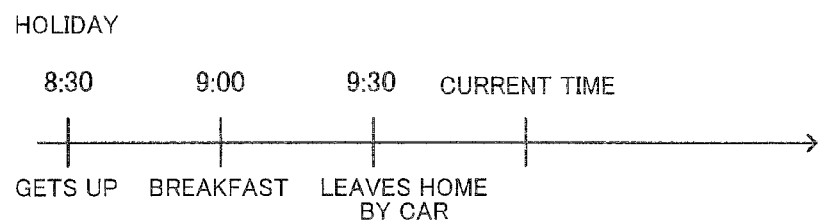
Figure 17D:
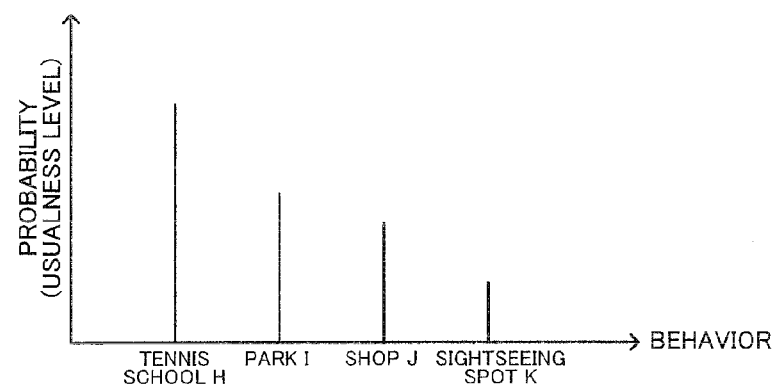

FIG. 17C shows an example of the state history of the user on a holiday. On a holiday, the user gets up at 8:30 AM, has breakfast at 9:00 AM, and leaves home by car at 9:30 AM. The state prediction section 108 predicts the subsequent behavior of the user based on the state history of the user.

The state prediction section 108 predicts that the user goes to a tennis school H with the highest probability (see FIG. 17D) based on the state history shown in FIG. 17C. When the actual behavior of the user identified by the state identification section 107 is going to the tennis school H, the usualness level evaluation section 110 evaluates that the usualness level of the user is high. On the other hand, when the user went to a sightseeing spot K distant from the center of the city, the usualness level evaluation section 110 evaluates that the usualness level of the user is low (i.e., unusual).

The information about the state of the user (i.e., usualness level evaluation target) may be information other than the information about the place of stay of the user. For example, the information about the state of the user may be information about a person who is talking with the user, information about the tension level of the user, or the like.

For example, suppose that the information about the state of the user (i.e., usualness level evaluation target) is information about a person who is talking with the user. In this case, the usualness level is evaluated to be high when the user is talking with a person who usually meets the user, and is evaluated to be low when the user is talking with a person who rarely meets the user. Specifically, when the place of stay of a first user and the place of stay of a second user are detected using the GPS sensor or the like. When the place of stay of the first user coincides with the place of stay of the second user and voice has been detected, it is determined that the first user is talking with the second user. Information about the frequency that the first user talks with the second user is acquired identification information about the first and second users and state historical information about the first and second users, and whether or not the first user usually talks with the second user is determined based on the frequency information.

For example, a low usualness level is linked to a photograph taken with a person who rarely meets the user. Therefore, when reproducing the photograph using the digital photo frame 300 or the like, the photograph taken with the person is preferentially extracted. (i.e., the photograph memorable for the user can be preferentially displayed).

When evaluating the usualness level, it is desirable to evaluate each of 5W1H (who, what, when, where, why, and how). For example, suppose that the user's company is situated in Shinjuku. In this case, the usualness level is evaluated to be high when the user is in Shinjuku on a weekday, and is evaluated to be low when the user is in Shinjuku on a holiday. Specifically, the evaluation result for the usualness level differs depending on the time zone and day even if the place is identical. When a first user and a second user who are coworkers at the office meet in the office on a weekday, the usualness level is evaluated to be high. When the first user and the second user meet in a place other than the office on a holiday, the usualness level is evaluated to be low. Specifically, the evaluation result for the usualness level differs depending on the time zone and the place of stay even if the persons are identical.

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term (e.g., wearable sensor and image) cited with a different term (e.g., sensor and media information) having a broader meaning or the same meaning at least once in the specification and the drawings can be replaced by the different term in any place in the specification and the drawings. The configuration and the operation of the information processing system are not limited to those described with reference to the above embodiments. Various modifications and variations may be made.

What is claimed is:

1. An information processing system comprising:
   a media information acquisition section that acquires media information;
   a media information storage section that stores the media information acquired by the media information acquisition section;
   a usualness level evaluation section that evaluates a usualness level of a user based on information that includes sensor information from at least one of a behavior sensor that measures a behavior of the user, a condition sensor that measures a condition of the user, and an environment sensor that measures an environment of the user; and
   a write section that writes the usualness level of the user evaluated by the usualness level evaluation section in the media information storage section so that the usualness level is linked to the media information acquired by the media information acquisition section.

2. The information processing system as defined in claim 1, further comprising:
   a search section that searches the media information stored in the media information storage section using the usualness level of the user linked to the media information.

3. The information processing system as defined in claim 2, the search section preferentially extracting the media information that was acquired when the usualness level of the user was low from the media information stored in the media information storage section.

4. The information processing system as defined in claim 1, further comprising:
   a transfer section that extracts the media information stored in the media information storage section using the usualness level of the user linked to the media information, and transfers the extracted media information to a second media information storage section.

5. The information processing system as defined in claim 4, the transfer section preferentially extracting the media information that was acquired when the usualness level of the user was high from the media information stored in the media information storage section, and transferring the extracted media information to the second media information storage section while deleting the extracted media information from the media information storage section.

6. The information processing system as defined in claim 4, the second media information storage section being an archive storage section that has a capacity larger than that of the media information storage section.

7. The information processing system as defined in claim 1, further comprising:
   a state estimation section that estimates a state of the user based on information that includes sensor information from at least one of the behavior sensor that measures a behavior of the user, the condition sensor that measures a condition of the user, and the environment sensor that measures an environment of the user,
   the usualness level evaluation section evaluating the usualness level of the user based on the state of the user estimated by the state estimation section.

8. The information processing system as defined in claim 7, further comprising:
   a usualness level information storage section that stores the usualness level so that the usualness level is linked to a place of stay of the user,
   the state estimation section specifying the place of stay of the user when the user acquired the media information; and
   the usualness level evaluation section evaluating the usualness level of the user by reading the usualness level linked to the specified place of stay of the user from the usualness level information storage section.

9. The information processing system as defined in claim 8, the usualness level information storage section storing the usualness level so that the usualness level is linked to the place of stay of the user and a time zone of stay of the user,
   the state estimation section specifying the place and time zone of stay of the user when the user acquired the media information, and
   the usualness level evaluation section evaluating the usualness level of the user by reading the usualness level linked to the specified place and time zone of stay of the user from the usualness level information storage section.

10. The information processing system as defined in claim 8, further comprising:
    a search section that searches the media information stored in the media information storage section using the usualness level of the user linked to the media information,
    the search section extracting the media information at an extraction rate that increases as the usualness level of the user with respect to the place of stay of the user when the user acquired the media information decreases.

11. The information processing system as defined in claim 8, further comprising:
    a transfer section that extracts the media information stored in the media information storage section using the usualness level of the user linked to the media information, and transfers the extracted media information to a second media information storage section,
    the transfer section extracting the media information at an extraction rate that increases as the usualness level of the user with respect to the place of stay of the user when the user acquired the media information increases, and transferring the extracted media information to the second media information storage section while deleting the extracted media information from the media information storage section.

12. The information processing system as defined in claim 8,
    the state estimation section specifying a stay area and a stay spot as the place of stay of the user, the stay spot being smaller than the stay area, and
    when the state estimation section has specified the stay spot as the place of stay of the user, the usualness level evaluation section evaluating the usualness level of the user by reading the usualness level linked to the specified stay spot from the usualness level information storage section.

13. The information processing system as defined in claim 12, the state estimation section determining whether or not the user stays within the stay area based on whether or not a standard deviation of a position of the user within a given period is equal to or less than a given first threshold value, and determining whether the user stays within the stay spot based on whether or not the standard deviation of the position of the user within the given period is equal to or less than a given second threshold value, the given second threshold value being smaller than the first threshold value.

14. A digital photo frame comprising: the information processing system according to claim 1; a display; and a display control section that displays an image on the display based on image data, the image data being the media information that has been written into the media information storage section of the information processing system.

15. An information processing system comprising:
a media information storage section that stores media information and a usualness level of a user when the media information was acquired, the media information being linked to the usualness level of the user; and
a search section that searches the media information stored in the media information storage section using the usualness level of the user linked to the media information,
the search section preferentially extracting the media information that was acquired when the usualness level of the user was low from the media information stored in the media information storage section.

16. The information processing system as defined in claim 15,
the search section extracting the media information at an extraction rate that increases as the usualness level of the user with respect to a place of stay of the user when the user acquired the media information decreases.

17. A digital photo frame comprising: the information processing system according to claim 15; a display; and a display control section that displays an image on the display based on image data, the image data being the media information that has been extracted by the information processing system.

18. An information processing system comprising:
a media information storage section that stores media information and a usualness level of a user when the media information was acquired, the media information being linked to the usualness level of the user; and
a transfer section that extracts the media information stored in the media information storage section using the usualness level of the user linked to the media information, and transfers the extracted media information to a second media information storage section,
the transfer section preferentially extracting the media information that was acquired when the usualness level of the user was high from the media information stored in the media information storage section, and transferring the extracted media information to the second media information storage section while deleting the extracted media information from the media information storage section.

19. The information processing system as defined in claim 18,
the transfer section extracting the media information at an extraction rate that increases as the usualness level of the user with respect to a place of stay of the user when the user acquired the media information increases, and transferring the extracted media information to the second media information storage section while deleting the extracted media information from the media information storage section.

20. An information processing method comprising:
acquiring media information;
storing the acquired media information in a media information storage section;
evaluating a usualness level of a user based on information that includes sensor information from at least one of a behavior sensor that measures a behavior of the user, a condition sensor that measures a condition of the user, and an environment sensor that measures an environment of the user; and
writing the usualness level of the user obtained by the evaluation in the media information storage section so that the usualness level is linked to the acquired media information.

21. An information processing method comprising:
storing media information and a usualness level of a user when the media information was acquired in a media information storage section, the media information being linked to the usualness level of the user;
searching the media information stored in the media information storage section using the usualness level of the user linked to the media information; and
preferentially extracting the media information that was acquired when the usualness level of the user was low from the media information stored in the media information storage section.

22. An information processing method comprising:
storing media information and a usualness level of a user when the media information was acquired in a media information storage section, the media information being linked to the usualness level of the user;
extracting the media information stored in the media information storage section using the usualness level of the user linked to the media information;
transferring the extracted media information to a second media information storage section;
preferentially extracting the media information that was acquired when the usualness level of the user was high from the media information stored in the media information storage section; and
transferring the extracted media information to the second media information storage section while deleting the extracted media information from the media information storage section.

23. A non-transitory computer program product storing a program code that causes a computer to execute the information processing method as defined in claim 20.

24. A non-transitory computer program product storing a program code that causes a computer to execute the information processing method as defined in claim 21.

25. A non-transitory computer program product storing a program code that causes a computer to execute the information processing method as defined in claim 22.

* * * * *